US012581262B2

(12) United States Patent
Ma et al.

(10) Patent No.: US 12,581,262 B2
(45) Date of Patent: Mar. 17, 2026

(54) AUGMENTED REALITY INTERACTION METHOD AND ELECTRONIC DEVICE

(71) Applicant: Huawei Technologies Co., Ltd., Shenzhen (CN)

(72) Inventors: Jiawei Ma, Nanjing (CN); Wenyang Zhang, Shanghai (CN); Longhua Li, Shenzhen (CN); Guorong Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/344,299

(22) Filed: Jun. 29, 2023

(65) Prior Publication Data

US 2023/0345196 A1     Oct. 26, 2023

Related U.S. Application Data

(63) Continuation of application No. PCT/CN2021/140320, filed on Dec. 22, 2021.

(30) Foreign Application Priority Data

Dec. 31, 2020     (CN) .......................... 202011627072.0

(51) Int. Cl.
| | |
|---|---|
| *G06T 7/73* | (2017.01) |
| *G06T 11/00* | (2006.01) |
| *H04S 7/00* | (2006.01) |

(52) U.S. Cl.
CPC ................ *H04S 7/302* (2013.01); *G06T 7/73* (2017.01); *G06T 11/00* (2013.01)

(58) Field of Classification Search
CPC ...... H04S 7/302; H04S 7/303; H04S 2400/11; H04S 7/304; G06T 7/73; G06T 11/00; G06T 19/00; G06T 19/006; G06F 3/165; G06F 3/011; G06F 3/012; G06F 3/0304; G06F 3/167
See application file for complete search history.

(56) References Cited

U.S. PATENT DOCUMENTS

| | | | |
|---|---|---|---|
| 8,970,709 B2 * | 3/2015 | Gonzalez-Banos .... | G01C 11/02 348/169 |
| 10,565,731 B1 * | 2/2020 | Reddy ..................... | G06F 3/012 |

(Continued)

FOREIGN PATENT DOCUMENTS

| | | |
|---|---|---|
| CN | 108681402 A | 10/2018 |
| CN | 111713121 A | 9/2020 |

(Continued)

OTHER PUBLICATIONS

Davison, "Real-time simultaneous localisation and mapping with a single camera," Proceedings Ninth IEEE International Conference on Computer Vision, Nice, France, 2003, pp. 1403-1410 vol. 2 (Year: 2003).*

*Primary Examiner* — William A Beutel

(74) *Attorney, Agent, or Firm* — Slater Matsil, LLP

(57)     ABSTRACT

An electronic device may determine pose information of a virtual object based on pose information of a real object or a location of a real sound source, to generate and display an AR image, and may further generate and play 3D sound data of the virtual object based on the pose information of the real object and the pose information of the virtual object.

20 Claims, 14 Drawing Sheets

~ 1201

An electronic device determines pose information of a real object and/or a location of a real sound source in a real scenario

~ 1202

The electronic device determines pose information of a virtual object based on the pose information of the real object and/or the location of the real sound source

~ 1203

The electronic device generates, based on the pose information of the virtual object, an AR image including the virtual object; and displays the AR image; and/or generates 3 dimensions 3D audio data of the virtual object based on the pose information of the real object and the pose information of the virtual object; and plays the 3D audio data

(56) References Cited

U.S. PATENT DOCUMENTS

| | | | |
|---|---|---|---|
| 2013/0041648 A1 | 2/2013 | Osman | |
| 2014/0292645 A1* | 10/2014 | Tsurumi | G06F 3/04883 |
| | | | 345/156 |
| 2018/0020312 A1* | 1/2018 | Visser | H04S 7/302 |
| 2018/0139565 A1 | 5/2018 | Norris et al. | |

FOREIGN PATENT DOCUMENTS

| | | | |
|---|---|---|---|
| CN | 111880659 A | 11/2020 | |
| CN | 111897431 A | 11/2020 | |
| CN | 111949112 A | 11/2020 | |

* cited by examiner (a)                                        (b)

Virtual object

Electronic device

AUGMENTED REALITY INTERACTION METHOD AND ELECTRONIC DEVICE

CROSS-REFERENCE TO RELATED APPLICATIONS

This application is a continuation of International Application No. PCT/CN2021/140320, filed on Dec. 22, 2021, which claims priority to Chinese Patent Application No. 202011627072.0, filed on Dec. 31, 2020. The disclosures of the aforementioned applications are hereby incorporated by reference in their entireties.

TECHNICAL FIELD

This application relates to the field of terminal technologies, and in particular, to an augmented reality (AR) interaction method and an electronic device.

BACKGROUND

An AR technology can integrate a virtual world with a real world, but how to improve authenticity of a virtual object is seldom concerned. Consequently, authenticity of a virtual role generated by using the AR technology is not high, resulting in poor user experience.

SUMMARY

This application provides an AR interaction method and an electronic device, to improve authenticity of a virtual object and improve user experience.

According to a first aspect, an embodiment of this application provides an AR interaction method. The method includes the following steps.

An electronic device determines pose information of a real object and/or a location of a real sound source in a real scenario, and the pose information of the real object represents a location and posture of the real object. Then, the electronic device determines pose information of a virtual object based on the pose information of the real object and/or the location of the real sound source, and the pose information of the virtual object represents a location and posture of the virtual object. Finally, the electronic device generates, based on the pose information of the virtual object, an AR image including the virtual object; and displays the AR image; and/or the electronic device generates three-dimensional 3D audio data of the virtual object based on the pose information of the real object and the pose information of the virtual object; and plays the 3D audio data.

According to this solution, the virtual object may perceive a pose of the real object and the location of the real sound source, and make a corresponding action response or sound response based on the foregoing information, so that the virtual object may be the same as the real object. Therefore, in this method, virtual-real interaction that combines visual and auditory perceptions of the virtual object and the real object is implemented. This can improve an intelligent level of the virtual object, and further improves experience of virtual interaction.

In a possible design, the electronic device may further establish a world coordinate system that uses the electronic device as an origin of coordinates. In this design, the pose information of the real object specifically represents the location and posture of the real object in the world coordinate system; the location of the real sound source is the location of the real sound source in the world coordinate system; and the pose information of the virtual object specifically represents the location and posture of the virtual object in the world coordinate system.

According to this design, accuracy of the pose information of the real object, the location of the real sound source, and the pose information of the virtual object that are determined by the electronic device can be improved.

In a possible design, the electronic device may establish, by performing the following steps, the world coordinate system that uses the electronic device as the origin of coordinates.

The electronic device obtains a first real-scenario image captured by a camera, and obtains posture information of the electronic device measured by an inertial measurement unit. The electronic device establishes the world coordinate system based on the first real-scenario image and the posture information of the electronic device according to a specified coordinate system construction algorithm (for example, a simultaneous localization and mapping (SLAM) algorithm).

In a possible design, the electronic device may determine the pose information of the real object in the real scenario by performing the following steps.

The electronic device obtains a second real-scenario image captured by the camera, and recognizes a key portion of a real object in the second real-scenario image. Then, the electronic device determines pose information of the key portion (for example, a head) of the real object in the second real-scenario image by using a simultaneous localization and mapping SLAM point cloud collision detection technology. Finally, the electronic device uses the pose information of the key portion of the real object as the pose information of the real object.

According to this design, when a volume of the real object is large, the electronic device may use the pose information of the key portion of the real object as the pose information of the real object.

In a possible design, the electronic device may determine the location of the real sound source in the real scenario by performing the following steps.

The electronic device obtains real-scenario sound information collected by a microphone, and determines a location relationship between the real sound source and the microphone through sound source positioning. Then, the electronic device determines the location of the real sound source in the real scenario based on the location relationship between the real sound source and the microphone. For example, the location of the real sound source in the world coordinate system is determined based on the location relationship between the real sound source and the microphone.

In a possible design, the electronic device may determine the pose information of the virtual object based on the pose information of the real object and/or the location of the real sound source, and at least one of the following: an action of the real object recognized based on the pose information of the real object, a sound instruction sent by the real sound source, an image model, an action feature, and an action response package in a virtual object model corresponding to the virtual object, and a touch operation performed by a user on the virtual object by using a display.

The pose information of the real object that is determined by the electronic device may be considered as pose information of the real object that is seen by the virtual object, and the location of the real sound source may be considered as a location of the real sound source that is heard by the virtual object. According to this design, the electronic device may determine the location of the virtual object based on the pose of the real object and the location of the real sound source that are perceived by the virtual object, so that the virtual object may make a corresponding action response based on the perceived pose of the real object and the perceive location of the real sound source. In this way, the virtual object may be the same as the real object. In addition, when determining the action response, the electronic device may further consider another factor, to improve flexibility of determining the pose information of the virtual object.

In a possible design, the electronic device may generate, by performing the following steps, the 3D audio data of the virtual object based on the pose information of the real object and the pose information of the virtual object.

The electronic device separately determines distances between two ears of the virtual object and two ears of the real object based on the pose information of the real object and the pose information of the virtual object. Then, the electronic device calculates a volume difference and a time difference between the two ears of the real object based on the distances between the two ears of the virtual object and the two ears of the real object. Finally, the electronic device generates the 3D audio data based on the volume difference and the time difference of the real object and original sound data of the virtual object.

According to this design, the electronic device may generate the 3D audio data based on the volume difference and the time difference of the real object, to improve authenticity of playing a 3D sound emitted by the 3D audio data.

In a possible design, the original sound data is set, or is determined based on at least one of the following: location and posture information of the real object, the pose information of the virtual object, the action of the real object recognized based on the pose information of the real object, the sound instruction sent by the real sound source, the image model, the action feature, and the action response package in the virtual object model corresponding to the virtual object, and the touch operation performed by the user on the virtual object by using the display.

In a possible design, before playing the 3D audio data, the electronic device may further filter the 3D audio data based on the pose information of the real object, so that reflections and refractions of the 3D audio data in a transmission process may be simulated, to make a 3D sound heard by the real object more authentic.

According to a second aspect, an embodiment of this application further provides an electronic device, including units or modules configured to perform the steps in the first aspect.

According to a third aspect, this application provides an electronic device, including at least one processing element and at least one storage element. The at least one storage element is configured to store a program and data, and the at least one processing element is configured to execute the program stored in the memory, so that the designs provided in the first aspect of this application can be implemented. Optionally, the electronic device may further include components such as a display, a camera, and an audio circuit.

According to a fourth aspect, an embodiment of this application further provides a computer storage medium. The storage medium stores a software program. When the software program is read and executed by one or more processors, the method provided in the design in the first aspect may be implemented.

According to a fifth aspect, an embodiment of this application further provides a computer program including instructions. When the instructions are run on a computer, the computer is enabled to perform the method provided in the designs in the first aspect.

According to a sixth aspect, an embodiment of this application further provides a chip system. The chip system includes a processor, configured to support an electronic device in implementing functions in the designs in the first aspect. In a possible design, the chip system further includes a memory. The memory is configured to store program instructions and data that are necessary for the electronic device. The chip system may include a chip, or may include a chip and another discrete component.

DETAILED DESCRIPTION OF ILLUSTRATIVE EMBODIMENTS

Figure 1:
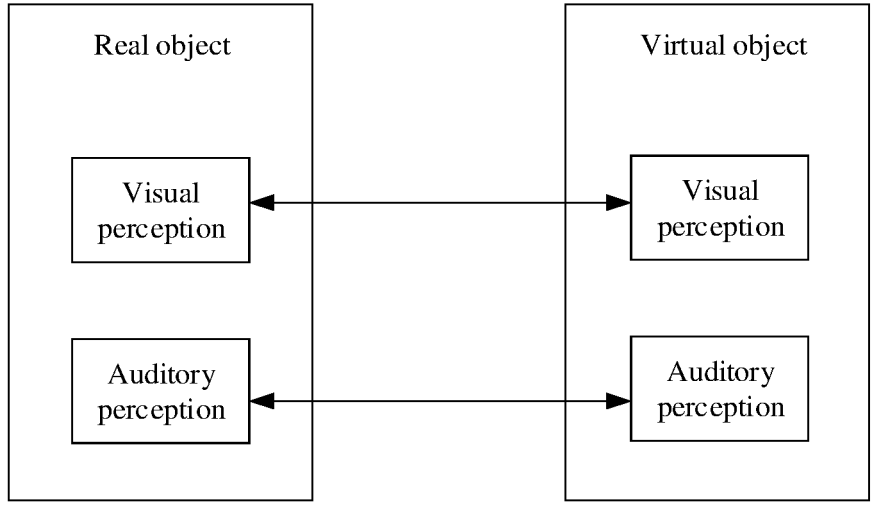
FIG. 1 is a schematic diagram of virtual-real audio-visual interaction according to an embodiment of this application.

This application provides an AR interaction method and an electronic device, to improve authenticity of a virtual object and improve user experience. The method and the electronic device are based on a same technical concept. Because the method and the electronic device have similar principles for resolving a problem, reference may be mutually made to implementations of the electronic device and the method. Repeated parts are not described again.

In the following, some terms in this application are described, to help a person skilled in the art have a better understanding.

(1) An electronic device is a device or an apparatus that has a data connection function, and a data calculation and processing function. For example, the electronic device may be a mobile phone, a tablet computer, a notebook computer, a netbook, a vehicle-mounted device, a smart home device (for example, a smart television), a business intelligent terminal (including a video phone, a conference desktop intelligent terminal, and the like), a personal digital assistant (PDA), an augmented reality (AR)/virtual reality (VR) device, or the like. A specific form of the electronic device is not limited in this application.

(2) A three-dimensional (3D) sound is a sound that can enable a listener to implement sound source positioning. It is known that 3D display uses parallax of two eyes of a user to construct 3D viewing experience. Similar to a concept of parallax, two ears of the user may perform most basic sound source positioning based on a volume difference and a time difference formed when a sound emitted by a same sound source reaches each of the two ears.

The volume difference is a difference in volumes of a same sound separately reaching the two ears of the user. The user may perceive, based on the volume difference, whether a location of the sound source is on the left or on the right. The user cannot accurately position the sound source only based on the volume difference. Therefore, the user need to position the sound source based on the time difference, that is, the HAAS effect. Generally, a condition for implementing the HASS effect is that a time difference between time points at which the same sound reaches each of the two ears of the user needs to be within 30 ms. Otherwise, two sound images are generated in a human brain, forming an echo (echo).

(3) A virtual object is a realistic object that is generated by a device such as a computer by using an AR technology and that has a sense of view, hearing, force, touch, and movement in a virtual world. For example, the virtual object may be a person, an animal, a scene, a static object, a text, or the like. The virtual object may generate various animation effects, for example, change a posture, make a sound, make an action or an expression, and interact with a real object.

Each virtual object is generally generated by a computer based on a corresponding virtual object model. Each virtual object model may not only set an image of the corresponding virtual object, but also set a sound feature, an action feature, and the like, and content such as a sound response package and an action response package of the virtual object.

A sound response of the virtual object is to make a sound, to respond to a real object in a real world, and is also referred to as an auditory response. An action response of the virtual object is to make an action, to respond to the real object in the real world, and is also referred to as a visual response.

Specifically, the virtual object may make a response (an action response and/or a sound response) to the real object based on a listening mode. The listening mode may specifically include visual listening and/or auditory listening. The visual listening means that the virtual object may make a response based on a location and posture information of the real object within a field of view of the virtual object (a field of view of a camera of an electronic device). The auditory listening means that the virtual object may make a response based on a heard real-scenario sound (real-scenario sound information obtained by using a microphone).

(4) A real object is an object that corresponds to the virtual object and that exists in the real world. For example, the real object may also be a person, an action, a scene, a scene, or the like. When the real object emits a sound, the real object may be used as a real sound source.

(5) A plurality of means two or more than two. At least one means one or more.

(6) The term "and/or" describes an association relationship between associated objects and indicates that three relationships may exist. For example, A and/or B may represent the following three cases: Only A exists, both A and B exist, and only B exists. The character "/" generally indicates an "or" relationship between the associated objects.

In addition, it should be understood that in descriptions of this application, terms such as "first" and "second" are merely used for distinguishing and description, but should not be understood as indicating or implying relative importance, or should not be understood as indicating or implying a sequence.

The following describes embodiments of this application in detail with reference to accompanying drawings.

An AR technology is to use a computer to generate a realistic virtual world (virtual environment), so that a user can be immersed in the virtual world, to implement natural interaction between the user and the virtual world. Currently, the AR technology mainly focuses on how to improve integration of the virtual world and a real world, but lacks attention to improving authenticity of a virtual object in the virtual world.

In the real world, when a first real object sees or hears a second real object, the first real object may directly make a corresponding response (an action response and/or a sound response). Certainly, if the second real object can make an action response and/or a sound response, the second real object may also make an action response and/or a sound response based on the action response and/or the sound response of the first real object.

Therefore, to improve the authenticity of the virtual object, in embodiments of this application, the virtual object may implement the foregoing audio-visual interaction with the real object like the real object, as shown in FIG. 1. In this way, the real object cannot only see and hear the virtual object, but also the virtual object can see and/or hear the real object, and can make some corresponding action responses and/or sound responses, so that the real object or a user can perceive that the virtual object has an audio-visual function.

According to solutions provided in embodiments of this application, the virtual object can see and/or hear the real object like the real object, and make some corresponding action responses and/or sound responses, so that the authenticity of the virtual object can be improved, and the user can be immersed in the virtual world, to finally improve user experience.

Figure 2:
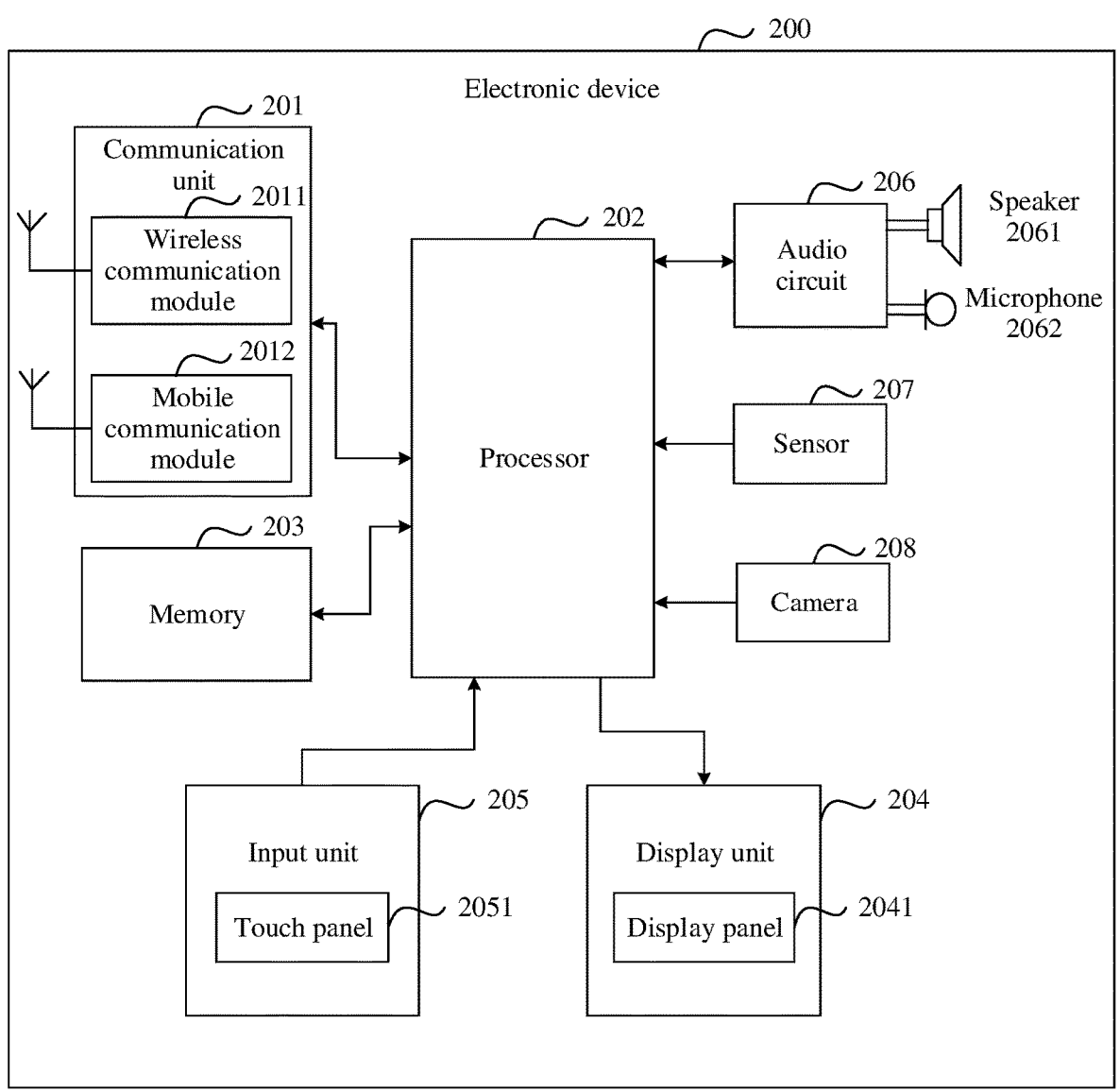
FIG. 2 is a diagram of a structure of an electronic device according to an embodiment of this application.

An AR interaction method provided in an embodiment of this application is applicable to an electronic device shown in FIG. 2. The following first describes a structure of the electronic device. FIG. 2 shows a possible structure of the electronic device. As shown in FIG. 2, an electronic device 200 includes components such as a communication unit 201, a processor 202, a memory 203, a display unit 204, an input unit 205, an audio circuit 206, a sensor 207, and a camera 208. The following specifically describes each component of the electronic device 200 with reference to FIG. 2.

The communication unit 201 is configured to: implement a function of the electronic device 200, and implement data communication with another device. Optionally, the communication unit 201 may include a wireless communication module 2011 and a mobile communication module 2012. In addition to the communication unit 201, the electronic device 200 further needs to cooperate with components such as an antenna, and a modem processor and a baseband processor in the processor 202, to implement a communication function.

The wireless communication module 2011 may provide a solution, applied to the electronic device, to wireless communication including a wireless local area network (wireless local area networks, WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communication module 2011 may be one or more components integrating at least one communication processor module. The wireless communication module 2011 receives an electromagnetic wave through the antenna, performs frequency modulation and filtering processing on the electromagnetic wave signal, and sends a processed signal to the processor 202. The wireless communication module 2011 may further receive a to-be-sent signal from the processor 202, perform frequency modulation and amplification on the signal, and convert the signal into an electromagnetic wave for radiation through the antenna. By using the wireless communication module 2011, the electronic device 200 may be connected to some nearby devices such as an access point, a wireless headset, or a wireless sounder.

The mobile communication module 2012 may provide a mobile communication solution that is applied to the electronic device and that includes 2G/3G/4G/5G. The mobile communication module 2012 may include at least one filter, a switch, a power amplifier, a low noise amplifier (LNA), and the like. The mobile communication module 2012 may receive an electromagnetic wave through the antenna, perform processing such as filtering or amplification on the received electromagnetic wave, and transmit the electromagnetic wave to the modem processor for demodulation. The mobile communication module 2012 may further amplify a signal modulated by the modem processor, and convert the signal into an electromagnetic wave for radiation through the antenna. In some embodiments, at least some functional modules in the mobile communication module 2012 may be disposed in the processor 202. In some embodiments, at least some functional modules of the mobile communication module 2012 may be disposed in a same device with at least some modules of the processor 202.

The electronic device 200 may establish a wireless connection to a base station in a mobile communication system by using the mobile communication module 2012, and receive a service of the mobile communication system by using the mobile communication module 2012.

The communication unit 201 may further include a communication interface, configured to implement a physical connection between the electronic device 200 and another device. The communication interface may be connected to a communication interface of the another device by using a cable, to implement data transmission between the electronic device 200 and the another device. For example, the electronic device 200 may be connected to a device such as a headset or a sounder by using the communication interface.

The memory 203 may be configured to store a software program and data. The processor 202 runs the software program and the data that are stored in the memory 203, to perform various functions and data processing of the electronic device 200. In this embodiment of this application, the software program may include an AR application for implementing the AR interaction method.

Optionally, the memory 203 may mainly include a program storage area and a data storage area. The program storage area may store an operating system, various software programs, and the like. The data storage area may store data input by a user, data created in a process of running the software program by the electronic device 200, or the like. The operating system may be HarmonyOS®, iOS®, Android®, Microsoft®, or the like. In addition, the memory 203 may include a high-speed random access memory, and may further include a nonvolatile memory, for example, at least one magnetic disk storage device, a flash memory device, or another volatile solid-state storage device. For example, in this embodiment of this application, an AR application for implementing a control method may be stored in the program storage area, and data such as a virtual object model, a location and posture of a virtual object, and a location and posture of a real object may be stored in the data storage area.

The input unit 205 may be configured to receive character information and a signal that are input by the user. Optionally, the input unit 205 may include a touch panel 2051 and another input device (for example, a function key). The touch panel 2051, also referred to as a touchscreen, may collect a touch operation performed by the user on or near the touch panel 2051, generate corresponding touch information, and send the touch information to the processor 202, to enable the processor 202 to execute a command corresponding to the touch information. The touch panel 2051 may be implemented in a plurality of types such as a resistive type, a capacitive type, an infrared type, and a surface acoustic wave type.

The display unit 204 is configured to present a user interface, to implement human-computer interaction. For example, the display unit 204 may display content such as information input by the user or information provided for the user, various menus of the electronic device 200, home screens (including icons of various applications), windows of various applications, an image photographed by a camera, and an AR image that is generated by an AR application and that includes a virtual object.

The display unit 204 may include a display panel 2041. The display panel 2041 is also referred to as a display, and may be configured in a form of a liquid crystal display (LCD), an organic light-emitting diode (OLED), or the like. It should be noted that the touch panel 2051 may cover the display panel 2041. Although in FIG. 2, the touch panel 2051 and the display panel 2041 are used as two independent components, to implement input and output functions of the electronic device 200, in this embodiment of this application, the touch panel 2051 and the display panel 2041 may be integrated (that is, a touch display), to implement the input and output functions of the electronic device 200.

The processor 202 is a control center of the electronic device 200, connects to the components through various interfaces and lines, and runs or executes the software program and/or the module stored in the memory 203 and invokes the data stored in the memory 203, to perform various functions of the electronic device 200 and process the data, to implement a plurality of services of the electronic device 200. For example, the processor 202 may run the AR application stored in the memory 203, to implement the AR interaction method provided in this embodiment of this application.

Optionally, the processor 202 may include one or more processing units. The processor 202 may integrate an application processor, the modem processor, the baseband processor, a graphics processing unit (GPU), and the like. The application processor mainly processes the operating system, the user interface, the application, and the like. The modem processor mainly processes wireless communication. It may be understood that the modem processor may alternatively not be integrated into the processor 202.

The audio circuit 206 (including a speaker 2061 and a microphone 2062) may provide an audio interface between the user and the electronic device 200. The audio circuit 206 may convert received audio data into an electrical signal and then transmit the electrical signal to the speaker 2061, and the speaker 2061 converts the electrical signal into a sound signal for output. In addition, the microphone 2062 converts a collected sound signal into an electrical signal, and the audio circuit 206 receives the electrical signal, and then converts the electrical signal into audio data for further processing such as transmission or storage. In this embodiment of this application, the electronic device 200 may collect, by using the microphone 2062, a sound signal emitted by a sound source, to perform sound source positioning based on the collected sound signal. In addition, the electronic device 200 may further output 3D audio data by using the speaker 2061 after generating the 3D audio data.

The electronic device 200 may further include one or more sensors 207, for example, a light sensor, a motion sensor, an ultrasonic sensor, and another sensor. The electronic device 200 may implement various functions based on real-time sensor data collected by the sensor 207.

The motion sensor may include an inertial measurement unit (IMU). The IMU is an apparatus for measuring posture information of the electronic device 200. The posture information of the electronic device 200 represents a motion posture of the electronic device 200, and may specifically include posture angles and accelerations of the electronic device 200 on three directional axes. Optionally, the IMU may include three acceleration sensors and three gyroscopes. Each acceleration sensor is configured to measure an acceleration on one directional axis, and each gyroscope is configured to measure a posture angle on one directional axis.

The electronic device 200 may further include at least one camera 208, to capture an image of a real scenario. When the electronic device 200 includes a plurality of cameras 208, the cameras 208 include a front-facing camera located on the front side of the electronic device 200, and further include a rear-facing camera located on the rear side of the electronic device 200.

It may be understood by a person skilled in the art that the structure of the electronic device 200 shown in FIG. 2 does not constitute a limitation on the electronic device to which this embodiment of this application is applicable, and the electronic device to which this embodiment of this application is applicable may include more or fewer components than those shown in the figure, or combine some components, or have different component arrangements.

In this embodiment of this application, a software system of the electronic device may use a layered architecture, an event-driven architecture, a microkernel architecture, a microservice architecture, or a cloud architecture. In this embodiment of this application, an Android system with a layered architecture is used as an example, to describe a software structure of the electronic device.

Figure 3:
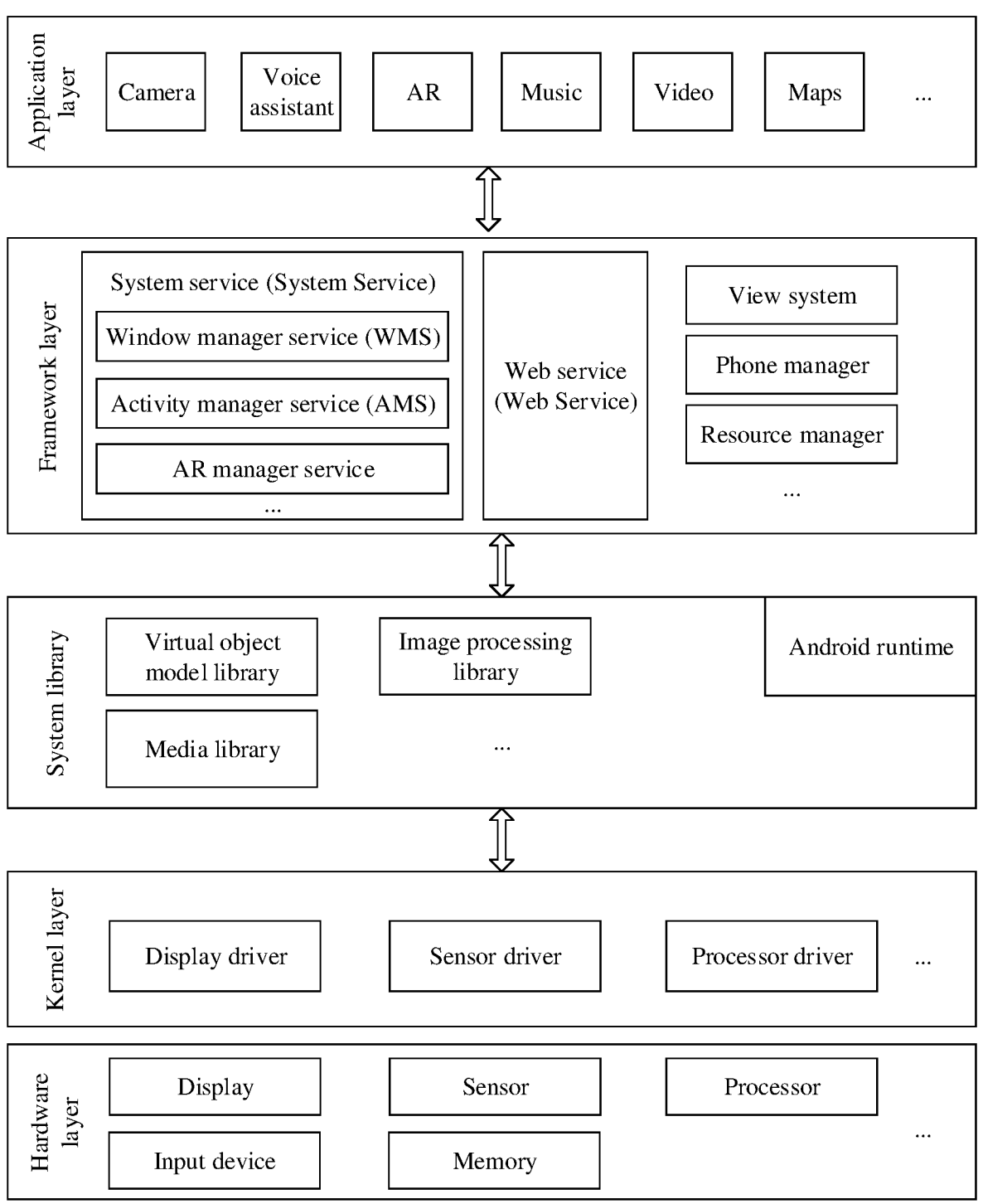
FIG. 3 is a diagram of a software architecture of an electronic device according to an embodiment of this application.

FIG. 3 is a block diagram of a software structure of an electronic device according to an embodiment of this application. As shown in FIG. 3, the software structure of the electronic device may be a layered architecture. For example, software may be divided into several layers, and each layer has a clear role and task. The layers communicate with each other through a software interface. In some embodiments, an Android system is divided into four layers: an application layer, a framework (FWK) layer, an Android runtime and system library, and a kernel layer from top to bottom.

The application layer may include a series of applications. As shown in FIG. 3, the application layer may include a camera application, a voice assistant application, an AR application, a music application, a video application, a map application, a third-party application, and the like. The third-party application may be a WeChat application, an iQIYI application, or the like.

The framework layer provides an application programming interface (API) and a programming framework for an application at the application layer. The application framework layer may include some predefined functions. As shown in FIG. 3, the application framework layer may include a system service, a view system, a web service, a phone manager, a resource manager, and the like.

The system service may include a window manager service (WMS), and an activity manager service (AMS). In this embodiment of this application, the system service may further include a system-level service, namely, an AR manager service. The following describes each service in the system service.

The window manager service is to provide a window manager service for a window (window), to specifically control display, hiding, and locations of all windows on a display. The window manager service may be specifically responsible for the following functions: 1. allocating a display surface to each window; 2. managing a display sequence, size, and location of the surface; 3. invoking a management function (such as a surface control function (SurfaceControl.Transaction)), to adjust transparency, a stretch coefficient, a location, and a size of the window, to implement animation effect of the window; and 4. providing a function related to an input system (for example, when the electronic device receives a touch event, the electronic device may provide, by using a window manager service, a proper window for a user to display or process this message).

The activity manager service is to provide a manager service for an activity in an application. The activity manager service may be, but is not limited to, responsible for the following functions: 1. uniformly scheduling life cycles of activities of all applications; 2. starting or ending an application process; 3. starting and scheduling a life cycle of the service; 4. registering a broadcast receiver, and receiving and distributing a broadcast; 5. querying a current running status of the system; and 6. scheduling a task.

The AR manager service is to implement the AR interaction method provided in this embodiment of this application, and provide an AR interaction service. The AR manager service may be, but is not limited to, responsible for the following functions: 1. constructing a world coordinate system; 2. determining a location and posture information of a real object in the world coordinate system; 3. recognizing a location of a real sound source in the world coordinate system; 4. determining a location and posture information of a virtual object in the world coordinate system; 5. generating 3D audio data based on at least one of the following items: the location and posture information of the real object, the location of the real sound source, and the location and posture information of the virtual object; and 6. generating, based on at least one of the following items: the location and posture information of the real object, the location of the real sound source, and the location and posture information of the virtual object, an AR image including the virtual object.

The view system includes visual controls such as a control for displaying a text and a control for displaying an image. The view system may be configured to construct an application. An interface may include one or more controls. For example, an interface including an SMS message notification icon may include the control for displaying a text and the control for displaying an image.

The web service is an API that can be invoked through a web page. The phone manager is configured to provide a communication function of the electronic device, for example, management of a call status (including answering, declining, or the like). The resource manager provides various resources such as a localized character string, an icon, an image, a layout file, and a video file for an application.

The Android runtime includes a kernel library and a virtual machine. The Android runtime is responsible for scheduling and management of the Android system. The kernel library includes two parts: a function that needs to be called by the Java language and the kernel library of the Android system, and is configured to provide an input/output service and a kernel service for the Android system. The application layer and the framework layer may run on the virtual machine. The virtual machine executes Java files at the application layer and the framework layer as binary files. The virtual machine is configured to implement functions such as object lifecycle management, stack management, thread management, security and exception management, and garbage collection.

The system library may include a plurality of functional modules, for example, a virtual object model library, a media library, and an image processing library.

The virtual object model library may be configured to manage a plurality of virtual object models. Each virtual object model is used to generate a virtual object. Each virtual object model may not only set an image of a corresponding virtual object, but also set a sound feature, an action feature, and the like, and content such as an auditory response package and a visual response package of the virtual object.

The media library supports playback and recording of audios and videos in a plurality of formats, and opening of static images in a plurality of formats. The media library may support a plurality of audio and video encoding formats, for example, MPEG-4, H.264, MP3, AAC, AMR, JPG, and PNG.

The kernel layer is a layer between hardware and software. The kernel layer includes at least a display driver, a sensor driver, a processor driver, a camera driver, an audio driver, and the like, and is configured to drive hardware at a hardware layer.

The hardware layer may include various sensors, a display, a processor, an input device, a memory, a camera, and the like.

To improve the authenticity of the virtual object in the AR technology, an embodiment of this application provides an AR interaction method. The method may implement virtual-real audio-visual interaction shown in FIG. 1. The following describes this solution in detail with reference to FIG. 4 based on the hardware structure of the electronic device shown in FIG. 2 and the software structure of the electronic device shown in FIG. 3.

Figure 4:
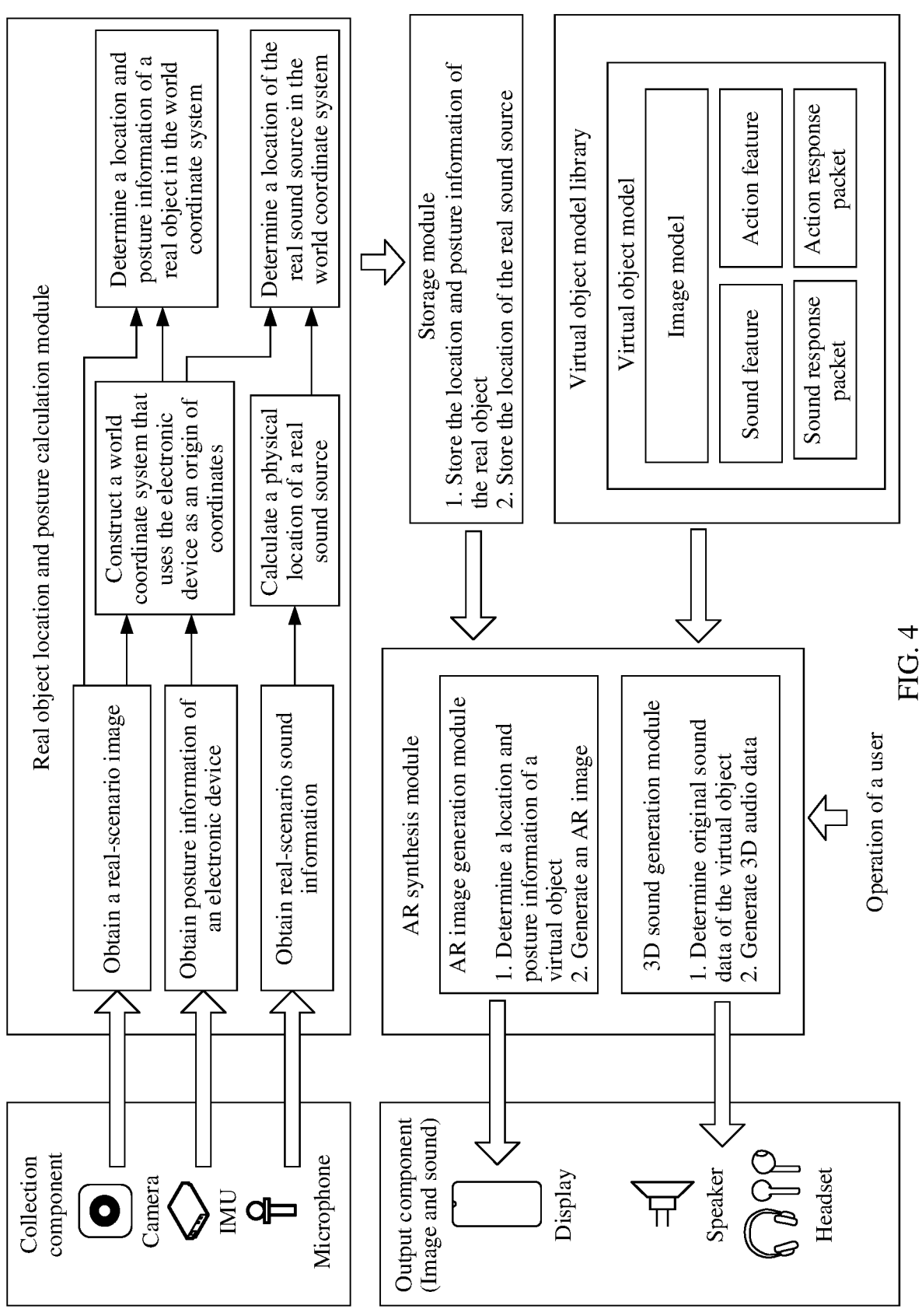
FIG. 4 is a block diagram of an implementation of an AR interaction method according to an embodiment of this application.

As shown in FIG. 4, based on different logical functions of the electronic device, software for implementing the AR interaction method in the electronic device may be divided into the following modules: a real object location and posture calculation module, a storage module, a virtual object model library, and an AR synthesis module. In addition, the method further needs to be implemented in cooperation with some other components inside or outside the electronic device. As shown in FIG. 4, these components may be classified into two categories: collection components and output components. The collection components may include: a camera, a motion sensor (the following only use an IMU in the motion sensor as an example for description), and a microphone. The output components may include a display, a speaker, or a headset.

The camera is configured to photograph a real scenario, to obtain an image of the real scenario (a real-scenario image for short). The IMU is configured to measure posture information of the electronic device. The posture information of the electronic device represents a motion posture of the electronic device, and may include posture angles and accelerations of the electronic device on three directional axes. Optionally, every two of the three directional axes are orthogonal to each other, to form a world coordinate system. The microphone is configured to collect a sound in the real scenario, to obtain real-scenario sound information.

The real object location and posture calculation module specifically includes the following functions: obtaining the real-scenario image captured by the camera and obtaining the posture information of the electronic device measured by the IMU; constructing, based on the obtained real-scenario image and the posture information of the electronic device, a world coordinate system that uses the electronic device as an origin of coordinates; recognizing a real object in the real-scenario image, and determining a location of the real object in the world coordinate system (the location of the real object for short) and posture information of the real object in the world coordinate system; obtaining the real-scenario sound information collected by the microphone; calculating a physical location of the real sound source based on the real-scenario sound information; and converting the physical location of the real sound source into a location of the real sound source in the world coordinate system (the location of the real sound source for short).

Similar to the posture information of the electronic device, the posture information of the real object represents a motion posture of the real object, and may include posture angles and accelerations of the real object on three directional axes of the world coordinate system. The physical location of the real sound source can represent a location relationship between the real sound source and the microphone (that is, the electronic device), for example, a direction in which the real sound source is located relative to the electronic device, and a distance between the real sound source and the electronic device.

Figure 5A:
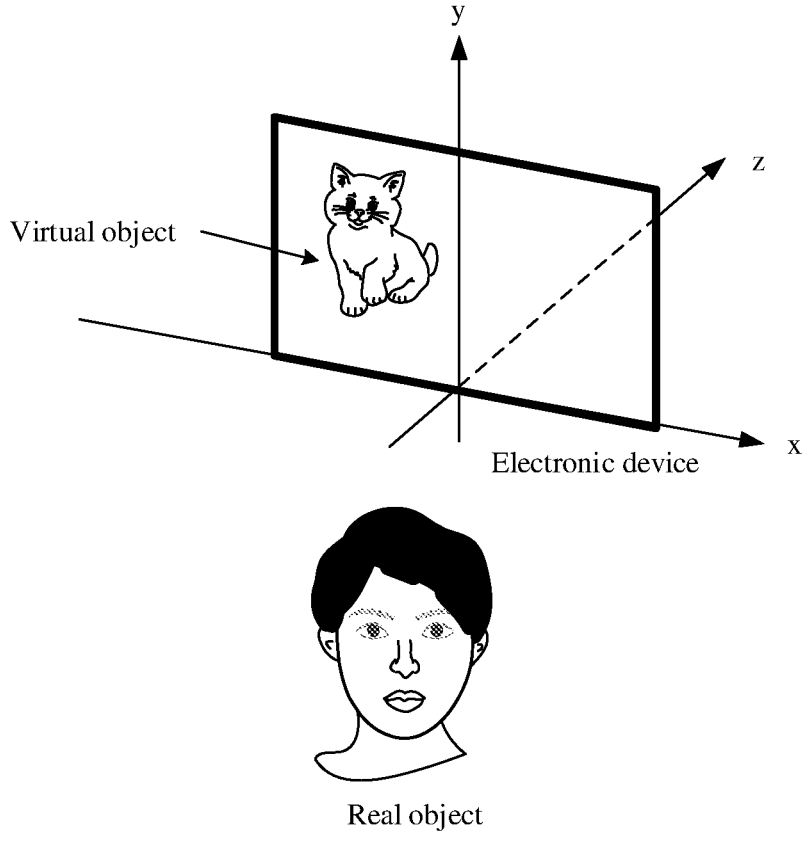
FIG. 5A is a schematic diagram of a world coordinate system of an electronic device according to an embodiment of this application.

Optionally, the real object location and posture calculation module may construct the world coordinate system based on the obtained real-scenario image and the posture information of the electronic device according to a simultaneous localization and mapping (SLAM) algorithm or another algorithm. It should be noted that the real object location and posture calculation module may use a corner of a display of the electronic device as an origin of coordinates, or use a central point of a side of the display as an origin of coordinates, or use a central point of the display as an origin of coordinates, or use a set location on the display as an origin of coordinates. This is not limited in this embodiment of this application. For example, the world coordinate system may be shown in FIG. 5A. The origin of coordinates is the central point of the side of the display, a virtual world can be displayed in the display, and a real world is outside the display.

In addition, the real object location and posture calculation module may determine the location and posture information of the real object in a plurality of manners. Because the size of the real object is large, to ensure accuracy, the real object location and posture calculation module may use a location and posture information of a key portion of the real object as the location and posture information of the real object.

Figure 5B:
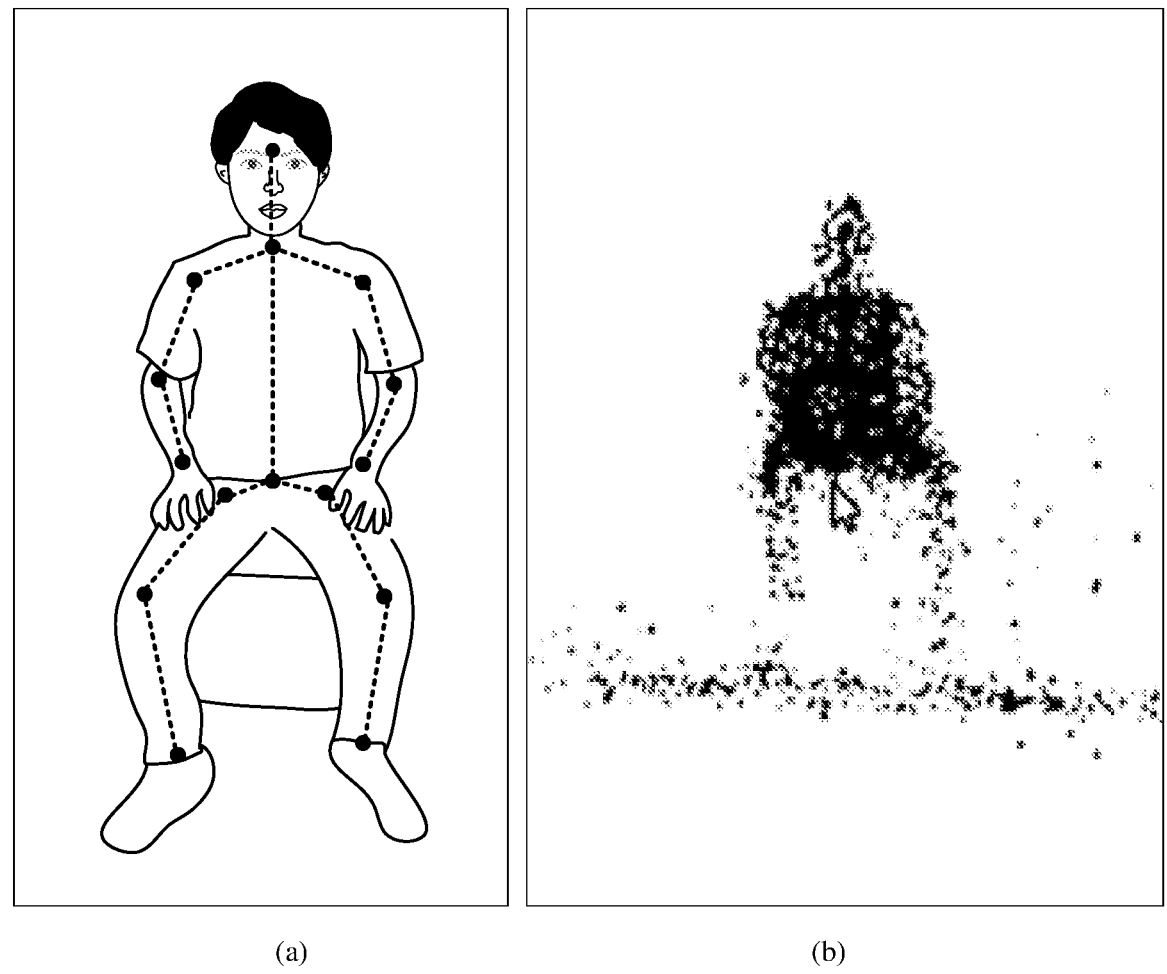
FIG. 5B is a simulation diagram of a SLAM point cloud collision result according to an embodiment of this application.

For example, the real object location and posture calculation module may recognize the key portion of the real object in the real-scenario image, collide the key portion of the real object with a SLAM point cloud, and calculate the location and posture information of the key portion based on a collision value. For example, a SLAM point cloud collision result is shown in FIG. 5B. (a) in FIG. 5B is the real object in the real-scenario image, and (b) in FIG. 5B is a simulation diagram of a SLAM point cloud collision result.

For another example, the real object location and posture calculation module may recognize the key portion of the real object in the real-scenario image, determine feature information of the key portion of the real object by using an image recognition technology, and finally determine the location and posture information of the real object based on the feature information of the key portion. For example, when the real object is a person or an animal, the key portion may be a head, and the real object location and posture calculation module may recognize feature information of the head (for example, including an eye, a nose, an ear, and a mouth) of the person or the animal.

It should be further noted that, in this embodiment of this application, the real object location and posture calculation module may recognize the key portion of the real object in the real-scenario image in a plurality of manners. For example, when the real object is a person or an animal, the real object location and posture calculation module may recognize a head of the real object by using a facial recognition technology or a skeletal feature recognition technology. For another example, the real object location and posture calculation module may use a 3D physical recognition technology, to recognize the key portion of the real object in the real-scenario image.

The real object location and posture calculation module may determine the location relationship between the real sound source and the microphone (that is, the physical location of the real sound source) by using a conventional sound source positioning technology, and finally convert the location relationship between the real sound source and the microphone into the location of the real sound source in the world coordinate system.

The storage module is configured to store the location and posture information of the real object calculated by the real object location and posture calculation module, and store the location of the real sound source.

The virtual object model library is configured to store at least one virtual object model. Each virtual object model may include, but is not limited to, at least one of the following: an image model, a sound feature, an action feature, a sound response package, and an action response package. The image model is used to set an image of the virtual object. The sound feature is used to set a sound emitted by the virtual object, and may specifically include a volume, a timbre, a pitch, and the like. The action feature is used to set an action that can be performed by the virtual object, and may specifically include an action type, an action amplitude, and the like. The sound response package includes a correspondence between sensing information of a plurality of virtual objects and an original sound that needs to be emitted. The action response package includes a correspondence between sensing information of a plurality of virtual objects and an action that needs to be performed.

The sensing information of the virtual object may include, but is not limited to, the following two types: visual sensing information and auditory sensing information. The visual sensing information includes the location and posture information of the real object, an action of the real object, and the like that are calculated by the real object location and posture calculation module. The auditory sensing information includes the location of the real sound source, a sound instruction sent by the real sound source, and the like. Optionally, the sensing information of the virtual object may further include touch operations performed by the user on the virtual object by using the display, and these touch operations may also be referred to as tactile sensing information. Optionally, the sound instruction sent by the real sound source may be obtained by performing voice recognition on the real-scenario sound information by using a voice recognition technology.

For example, the following uses a virtual object model in which the virtual object is a person as an example, to describe the virtual object model in detail.

The image model may specifically set a gender, a height, a weight, a body ratio, facial features, a clothing feature, another visual feature (a location of a facial spot), and the like.

The sound feature may specifically set a volume, a timbre, and a tone, so that a sound feature of a sound emitted by the virtual object conforms to the image of the virtual object.

The action feature may specifically set a basic action that can be performed by the virtual object, for example, walking, running, jumping, handshake, and waving. Any one of these basic actions may be an independent action response of the virtual object, or may be repeated for a plurality of times or combined with another basic action, to form an action response of the virtual object.

The sound response package may include: When the sensing information of the virtual object represents that the real object approaches, a corresponding original sound is "Hello"; when the sensing information of the virtual object represents that the real object leaves, a corresponding original sound is "Goodbye"; and when the user performs a touch operation of tapping the virtual object by using the display, a corresponding original sound is laughter.

The action response package may include: When the sensing information of the virtual object represents that the real object approaches, a corresponding action is approaching, reaching out, and shaking hands; when the sensing information of the virtual object represents that the real object leaves, a corresponding action is raising a hand, and waving; and when the user performs a touch operation of tapping the virtual object by using the display, a corresponding action is shaking.

The AR synthesis module is configured to: synthesize an AR image and 3D audio data by using the AR technology, display the AR image on the display, and play the 3D audio data by using the speaker, the headset, and the like. Specifically, the AR synthesis module may specifically include an AR image generation module and a 3D sound generation module.

Specifically, the AR image generation module may specifically synthesize the AR image by performing the following steps.

A1: The AR image generation module determines a location and posture information of the virtual object.

Optionally, the AR image generation module may determine the location and posture information of the virtual object in a plurality of manners.

Optionally, the AR image generation module determines the location and posture information of the virtual object in real time based on at least one of the following: the location and posture information of the real object, the action of the real object, the location of the real sound source, the sound instruction sent by the real sound source, the image model, the action feature, and the action response package in the virtual object model, and the touch operation performed by the user on the virtual object by using the display. Similar to the posture information of the real object, the posture information of the virtual object represents a motion posture of the virtual object, and may include posture angles and accelerations of the virtual object on three directional axes of the world coordinate system.

For another example, the location and posture information of the virtual object may be set by the electronic device, or set by the user, or set by the virtual object model.

A2: The AR image generation module may synthesize the AR image based on the location and posture information of the virtual object. For this process, refer to a conventional AR image synthesis technology. Details are not described herein again. Optionally, in this step, the AR image generation module may further synthesize the AR image by using the real-scenario image.

In addition, the 3D sound generation module may further specifically synthesize the 3D audio data by performing the following steps.

B1: The 3D sound generation module may determine original sound data of the virtual object based on at least one of the following: the location and posture information of the real object, the action of the real object, the location of the real sound source, the sound instruction sent by the real sound source, the sound feature, the sound response package, and the touch operation performed by the user on the virtual object by using the display.

B2: The 3D sound generation module generates the 3D audio data based on the location and posture information of the real object, the location and posture information of the virtual object, and the original sound data.

For example, the step B2 may specifically include the following steps.

C1: The 3D sound generation module calculates distances between two ears of the virtual object and two ears of the real object based on the location and posture information of the real object and the location and posture information of the virtual object.

C2: The 3D sound generation module calculates a volume difference and a time difference between the two ears of the real object based on the distances between the two ears of the virtual object and the two ears of the real object.

C3: The 3D sound generation module generates the 3D audio data based on the obtained volume difference and time difference between the two ears of the real object and the original sound data. Optionally, before playing the 3D audio data, the 3D sound generation module may further filter the 3D audio data based on the posture information of the real object, to further improve authenticity of a 3D sound.

The display in the output components is configured to display the AR image. The speaker or the headset in the output components is configured to play the 3D audio data. In this way, the user can hear the 3D sound, and perceive a location of a virtual sound source (that is, the virtual object) through sound source positioning.

It should be noted that, the electronic device may obtain the real-scenario image, the posture information of the electronic device, and the real-scenario sound information in real time or periodically, to help update an audio-visual response of the virtual object in real time or periodically, so that the virtual object can quickly make a corresponding audio-visual response based on a perceived real world, to improve authenticity of the virtual object.

It should be further noted that, when the software structure of the electronic device is shown in FIG. 3, the real object location and posture calculation module, the storage module, and the AR synthesis module in the foregoing AR interaction solution may be implemented by using the AR manager service in the system service at the framework layer of the electronic device, and the virtual object model library in this solution may be implemented by using the virtual object model located in the system library. In addition, interaction between each module in this solution and each of the collection component and the output component may be implemented by using a client, for example, implemented by the AR application at the application layer. It is clear that, this solution may be implemented by combining a background system service and a foreground client.

According to the AR interaction solution provided in this embodiment of this application, virtual-real interaction that combines visual and auditory perceptions can be implemented, to bring better immersive experience to the user of the AR application. In addition, by combining various recognition technologies, a virtual role can perceive the location and the posture of the real object and the location of the real sound source, and make a corresponding action response and a corresponding sound response based on the foregoing information, so that an intelligence level of the virtual object can be improved, to improve experience of virtual-real interaction. In addition, this solution may be implemented by using an architecture of a server and a client, so that operability of the client is higher, to help a developer develop a rich and colorful immersive AR application.

Figure 6:
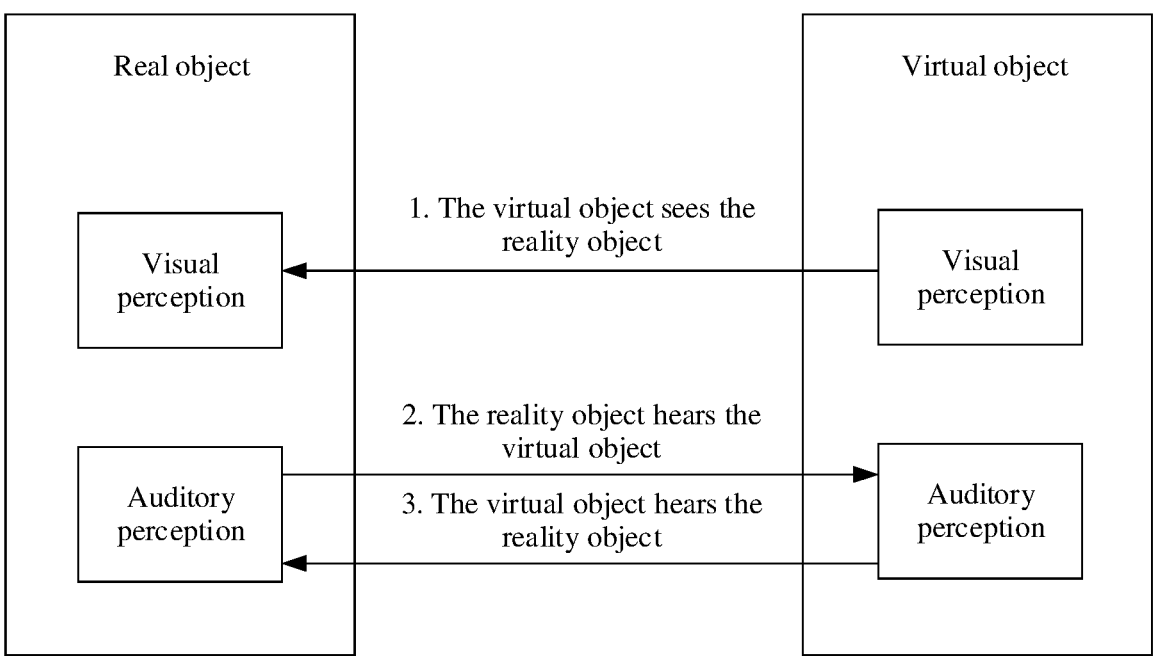
FIG. 6 is a schematic diagram of virtual-real audio-visual interaction according to an embodiment of this application.

Based on the electronic device shown in FIG. 2 and FIG. 3 and the AR interaction solution shown in FIG. 4, this application further provides a plurality of embodiments, to respectively implement different virtual-real audio-visual interaction shown in FIG. 6. As shown in FIG. 6, virtual-real audio-visual interaction, for example, a virtual object seeing a reality object, a reality object hearing a virtual object, and a virtual object hearing a reality object can be implemented respectively in the following embodiments. That the virtual object sees the reality object means that the virtual object may make an action response or a sound response based on a location and posture information of a real object in a field of view of the virtual object. That the reality object hears the virtual object means that the virtual object may make a 3D sound based on a location and posture information of the real object and a location and posture information of the virtual object, so that the real object can hear the 3D sound, and the location of the virtual object is arranged through sound source positioning. That the virtual object hears the reality object means that the virtual object may determine a physical location of a real sound source based on real-scenario sound information collected by a microphone, and make an action response or a sound response based on the location of the real sound source.

Embodiment 1: Visual Interaction—the Virtual
Object Sees the Reality Object

Figure 7:
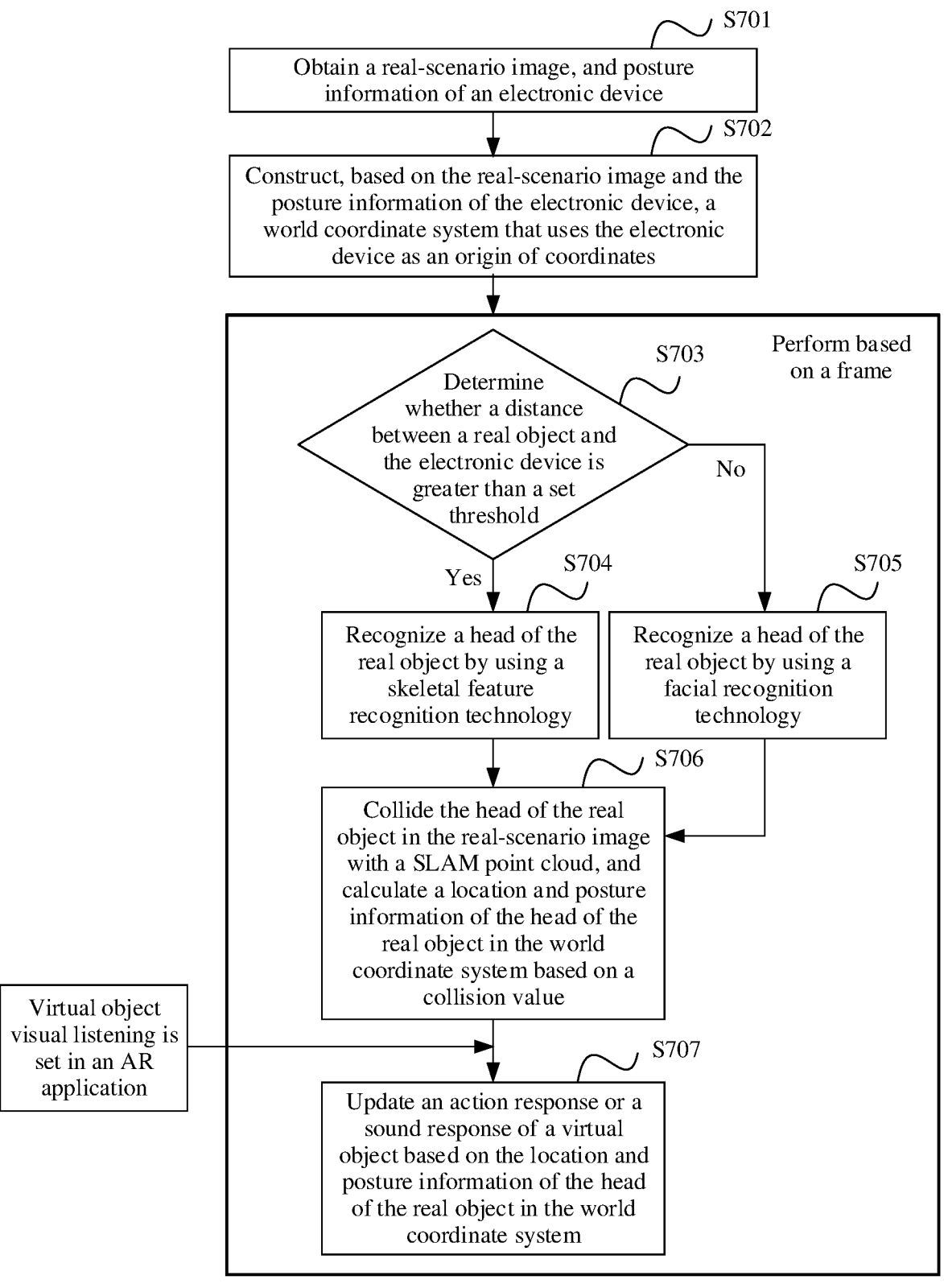
FIG. 7 is a flowchart of AR interaction according to an embodiment of this application.

Referring to an AR interaction flowchart shown in FIG. 7, the following describes in detail, by using an example in which a real object is a person, the AR interaction method provided in this embodiment.

S701: The electronic device obtains a real-scenario image captured by a camera, and obtains posture information of the electronic device collected by a motion sensor (IMU).

S702: The electronic device constructs, based on the real-scenario image and the posture information of the electronic device, a world coordinate system that uses the electronic device as an origin of coordinates. For example, the electronic device may construct the world coordinate system according to a SLAM algorithm.

It should be noted that, after constructing the world coordinate system, the electronic device may directly use the world coordinate system subsequently until the world coordinate system becomes invalid (for example, the electronic device moves); or periodically update the world coordinate system. A length of an update periodicity is not limited in this application, and the update periodicity may be greater than or equal to a capturing periodicity of the real-scenario image.

S703: The electronic device determines whether a distance between the real object and the electronic device is greater than a set threshold; and if yes, S704 is performed; otherwise, S705 is performed.

Because face details need to be viewed in a facial recognition technology, if the real object is far away from the electronic device, face details in the real-scenario image cannot be clearly displayed, and an inaccurate recognition result may be caused. However, a skeletal feature recognition technology is implemented based on an entire skeletal feature of a human body. Even if the real object is far away from the electronic device, accuracy of a recognition result is not affected.

In addition, the electronic device may determine the distance between the real object and the electronic device in a plurality of manners. For example, the electronic device may detect the distance between the real object and the electronic device by using an internal infrared sensor, an internal ultrasonic sensor, or the like.

S704: When the distance between the real object and the electronic device is greater than the set threshold, the electronic device recognizes a head of the real object by using the skeletal feature recognition technology.

S705: When the distance between the real object and the electronic device is less than or equal to the set threshold, the electronic device recognizes a head of the real object by using the facial recognition technology.

S706: The electronic device collides the head of the real object in the real-scenario image with a SLAM point cloud, and calculates a location and posture information of the head of the real object in the world coordinate system based on a collision value, for example, as shown in FIG. 5B. For a specific process of this step, refer to a conventional SLAM point cloud collision method. Details are not described herein again.

Optionally, the electronic device may further determine the location and posture information of the head of the real object in the world coordinate system according to another method. For example, when the distance between the real object and the electronic device is less than or equal to the set threshold, the electronic device may determine feature information of the head (for example, feature information of at least one of an eye, a nose, an ear, and a mouth) of the real object by using the image recognition technology, and finally determine the location and posture information of the real object based on the feature information of the head.

S707: When virtual object visual listening is set in an AR application (that is, the virtual object performs an action response and/or a sound response based on visual sensing information), the electronic device updates the action response or the sound response of the virtual object based on the location and posture information of the head of the real object in the world coordinate system.

The visual sensing information of the virtual object includes a location and posture information of the real object, an action of the real object, and the like that are calculated by a real object location and posture calculation module.

Optionally, the electronic device may repeatedly perform S703 to S707 based on an update periodicity of the real-scenario image (that is, perform S703 to S707 based on a frame), so that the virtual object can make a response based on real-time visual sensing information.

For a specific process of this step, refer to the process of generating the AR image and generating the 3D audio data by the AR synthesis module in the embodiment shown in FIG. 4, and details are not described herein again.

In this embodiment of this application, the electronic device may construct, by using an existing SLAM technology based on the real-scenario image photographed by the camera and the posture information of the electronic device collected by the IMU, the world coordinate system that uses the electronic device as the origin of coordinates. In addition, the electronic device may use a field of view of the camera as the field of view of the virtual object, to determine the location and posture information of the real object in the field of view of the virtual object in the world coordinate system, and further enable the virtual object to perform, based on the location and posture information of the real object, a corresponding action. For example, when a real person appears in a visual range of the virtual object, eyes of the virtual object adaptively follows the real person, and/or moves with the real person.

Embodiment 2: Visual Interaction—the Reality
Object Hears the Virtual Object

Figure 8:
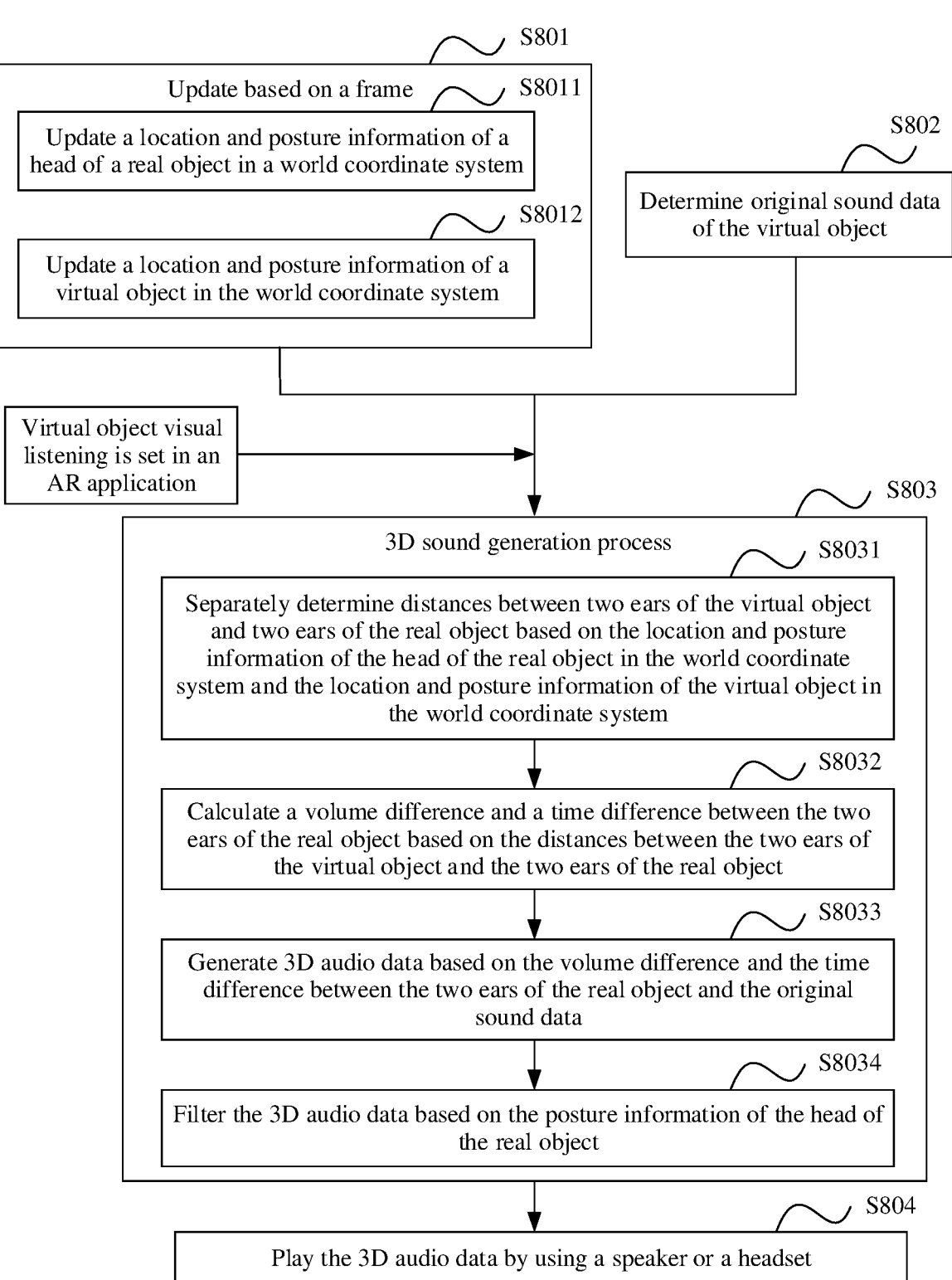
FIG. 8 is another flowchart of AR interaction according to an embodiment of this application.

Referring to an AR interaction flowchart shown in FIG. 8, the following describes in detail, by using an example in which the real object is a person, the AR interaction method provided in this embodiment.

S801: The electronic device may update, based on an update periodicity of a real-scenario image, a location and posture information of a head of the real object in a world coordinate system, and a location and posture information of the virtual object in the world coordinate system. This specifically includes step S8011 and step S8012.

S8011: The electronic device updates the location and posture information of the head of the real object in the world coordinate system. For a specific process, refer to the method described in S701 to S706 in the embodiment shown in FIG. 7. Details are not described herein again.

S8012: The electronic device updates the location and posture information of the virtual object in the world coordinate system. Optionally, the location and posture information of the virtual object in the world coordinate system may be set by the electronic device, or set by a user, or may be determined by the electronic device in real time. For example, the electronic device may determine the location and posture information of the virtual object in the world coordinate system with reference to the step A1 performed by the AR image generation module in the embodiment shown in FIG. 4.

When virtual object visual listening is set in an AR application (that is, the virtual object performs a sound response based on visual sensing information), the electronic device may perform the following step S802 to step S804.

S802: The electronic device determines original sound data of the virtual object. Similar to S8012 in which the electronic device determines the location and posture information of the virtual object in the world coordinate system, the original sound data of the virtual object may be set by the electronic device, or set by the user, or may be determined by the electronic device in real time. For example, the electronic device may determine the original sound data of the virtual object with reference to the step B1 performed by the 3D sound generation module in the embodiment shown in FIG. 4.

S803: The electronic device generates 3D audio data based on the location and posture information of the head of the real object in the world coordinate system, the location and posture information of the virtual object in the world coordinate system, and the original sound data of the virtual object. This may specifically include steps S8031 to S8034.

S8031: The electronic device separately determines distances between two ears of the virtual object and two ears of the real object (namely, a distance between the left ear of the virtual object and the left ear of the real object, and a distance between the right ear of the virtual object and the right ear of the real object) based on the location and posture information of the head of the real object in the world coordinate system and the location and posture information of the virtual object in the world coordinate system.

S8032: The electronic device calculates a volume difference and a time difference between the two ears of the real object based on the distances between the two ears of the virtual object and the two ears of the real object.

S8033: The electronic device generates the 3D audio data based on the obtained volume difference and time difference between the two ears of the real object, and the original sound data.

S8034: The electronic device may filter the 3D audio data based on the posture information of the head of the real object, to further improve authenticity of the 3D sound. In a process of transmitting a sound in a transmission medium, the sound may undergo various reflections and refractions. Therefore, by filtering the 3D audio data, reflections and refractions of the 3D audio data in the transmission process may be simulated, to make a 3D sound heard by the real object more authentic.

S804: The electronic device plays the 3D audio data by using a speaker or a headset. The real object may hear the 3D sound, and perform sound source positioning based on the 3D sound, to perceive the location of the virtual object.

In this embodiment of this application, the electronic device may update the location and posture information of the virtual object and the location and posture information of the real object in real time, so that the 3D audio data may be synthesized based on a location and posture relationship between the virtual object and the real object, to make the played 3D sound more authentic. For example, a virtual musical instrument in the virtual world may emit a 3D sound according to the foregoing method, and a person in the real world may determine a specific location of the virtual musical instrument in the virtual world based on the 3D sound emitted by the headset. For another example, there are a plurality of virtual characters in the virtual world. After a virtual character emits a 3D sound according to the foregoing method, a person in the real world may determine, by using the 3D sound emitted by the headset, the virtual character from which the sound comes. For still another example, in a virtual world in which there is a flower, bird, fish, worm, mountain, or river, each virtual object may emit a 3D sound according to the foregoing method. In this way, a person in the real world may determine, based on the 3D sound emitted by the headset, a specific virtual object that exists in the virtual world, a location of the virtual object, and the like, so that the person in the real world feels more immersive.

Figure 9:
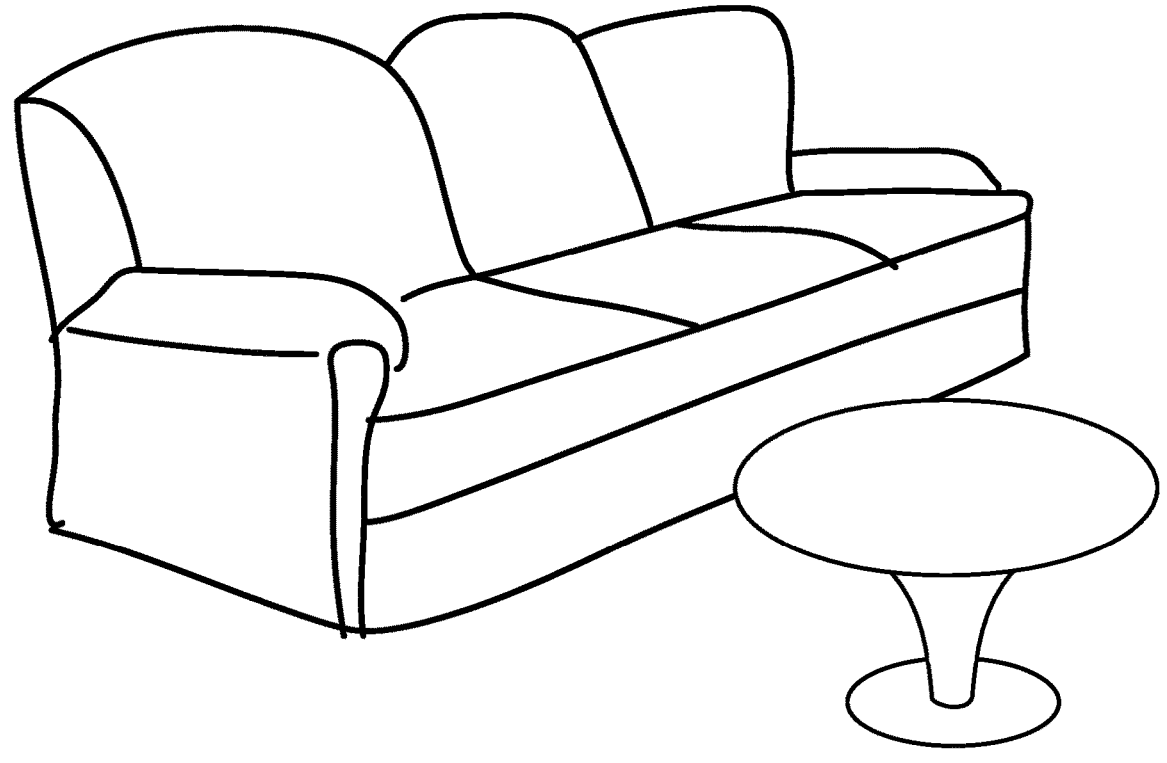
FIG. 9 is a schematic diagram of an example of AR interaction according to an embodiment of this application.
Figure 9:
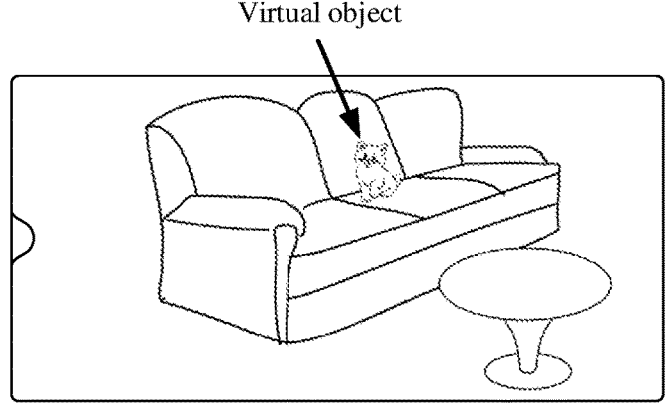

For yet another example, as shown in FIG. 9, a virtual object (a virtual cat) in the virtual world may send a 3D sound (mew) according to the foregoing method. A person in the real world may determine, by using the 3D sound emitted by the headset, that the virtual cat is located in the middle of a sofa rather than on a tea table, to ensure that what a person hears by using the headset is consistent with what is seen by using the display of the electronic device.

Figure 10:
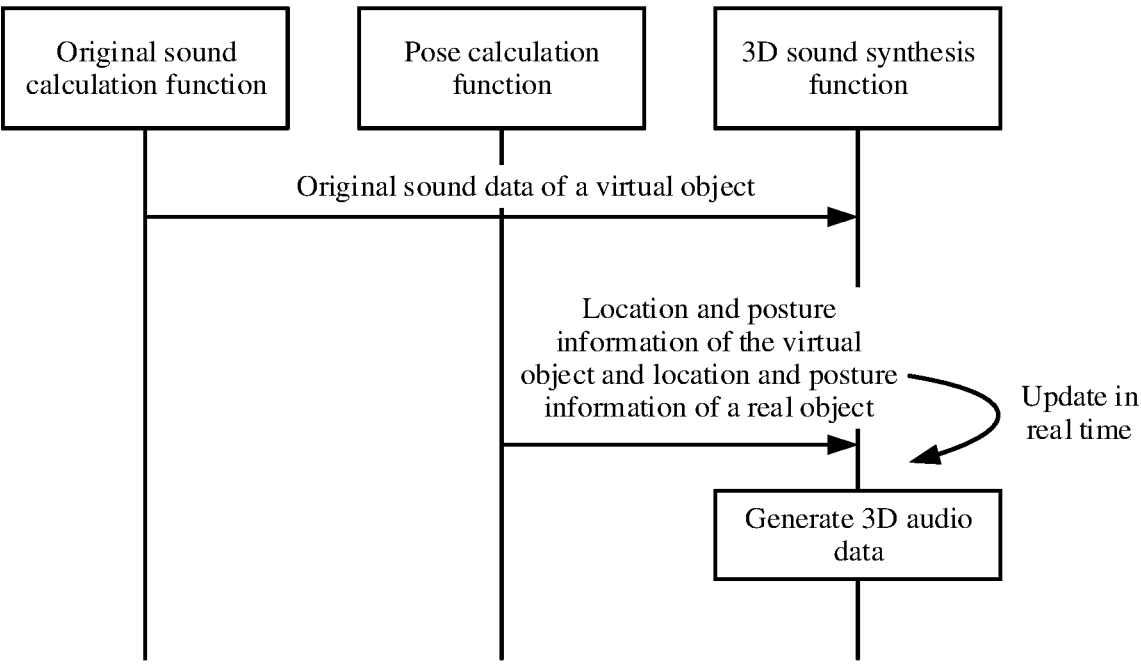
FIG. 10 is a flowchart of an implementation of an AR interaction service according to an embodiment of this application.

Refer to a flowchart of an implementation of an AR interaction service shown in FIG. 10. The electronic device may implement, by using but not limited to the following functions: an original sound calculation function, a pose calculation function, and a 3D sound synthesis function, the AR interaction method shown in FIG. 8. The 3D sound synthesis function may invoke the original sound calculation function, to obtain the original sound data of the virtual object; and invoke the pose calculation function, to update the location and posture information of the virtual object and the location and posture information of the real object in real time; and finally, the 3D audio data may be generated based on the original sound data of the virtual object, the location and posture information of the virtual object, and the location and posture information of the real object.

Figure 11:
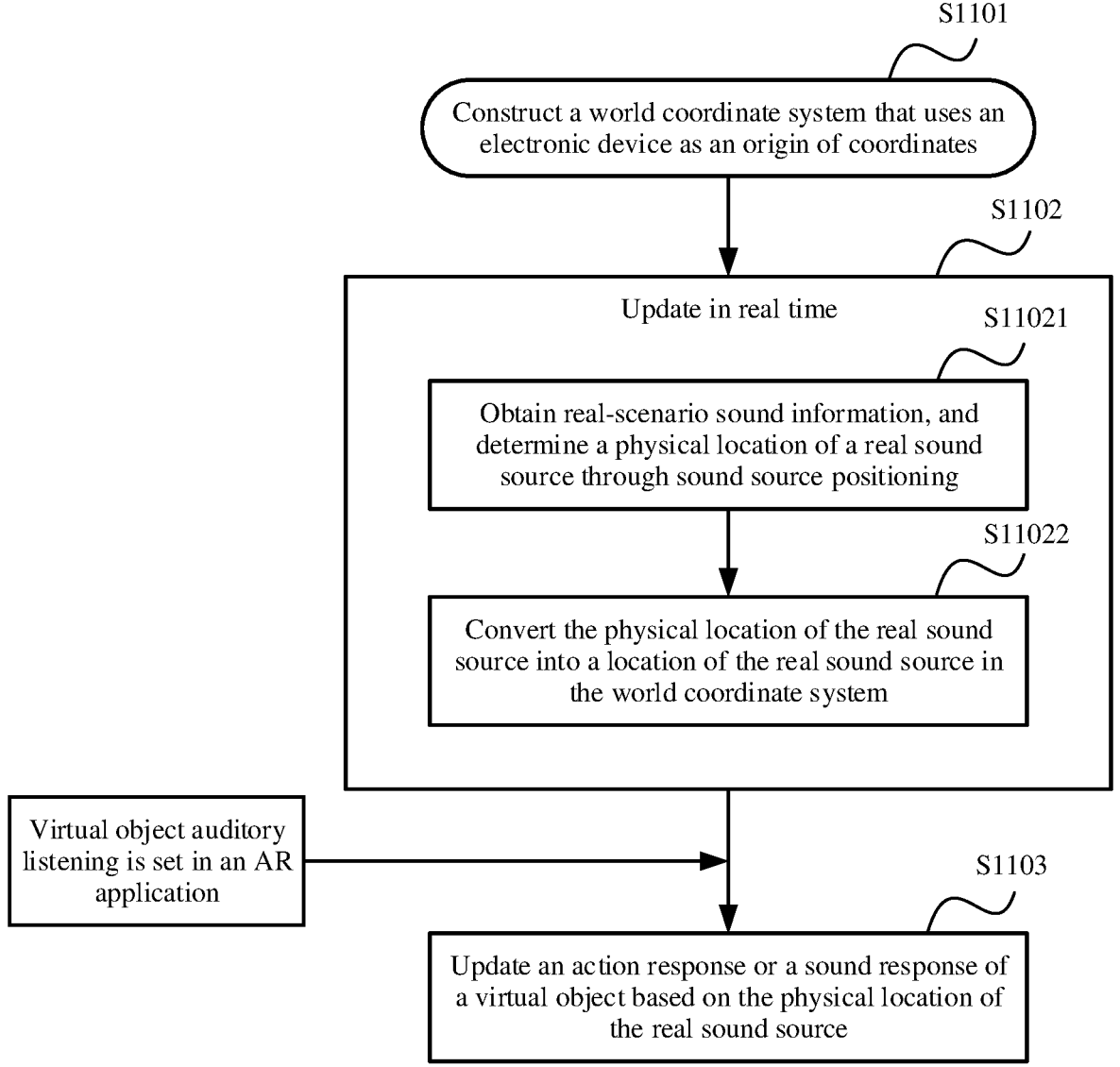
FIG. 11 is still another flowchart of AR interaction according to an embodiment of this application.

Embodiment 3: Auditory Interaction—the Virtual Object Hears the Reality Object Refer to an AR interaction flowchart shown in FIG. 11. The following describes in detail the AR interaction method provided in this embodiment of this application.

S1101: The electronic device constructs a world coordinate system that uses the electronic device as an origin of coordinates. For a specific process, refer to descriptions in S701 and S702 in the embodiment shown in FIG. 7. Details are not described herein again.

S1102: The electronic device collects the real-scenario sound information in real time by using a microphone, and determines a location of the real sound source in the world coordinate system through sound source positioning. This may specifically include step S11021 and step S11022.

S11021: The electronic device collects the real-scenario sound information in real time by using the microphone, and determines the physical location of the real sound source through sound source positioning.

The physical location of the real sound source can represent a location relationship between the real sound source and the microphone (that is, the electronic device), for example, a direction in which the real sound source is located relative to the electronic device, and a distance between the real sound source and the electronic device.

S11022: The electronic device converts the physical location of the real sound source into the location of the real sound source in the world coordinate system.

S1103: When virtual object auditory listening is set in an AR application (that is, the virtual object performs an action response and/or a sound response based on auditory sensing information), the electronic device updates the action response and/or the sound response of the virtual object based on the location of the real sound source in the world coordinate system.

The auditory sensing information of the virtual object includes the location of the real sound source in the world coordinate system, a sound instruction sent by the real sound source, and the like.

For a specific process of this step, refer to the process of generating the AR image and generating the 3D audio data by the AR synthesis module in the embodiment shown in FIG. 4, and details are not described herein again.

According to this embodiment of this application, when the real sound source in the real world emits a sound, the virtual object in the virtual world may recognize the location of the real sound source, and make the action response or the sound response based on the location of the real sound source. For example, when a person in the real world makes a blowing sound, a seed that is of a dandelion in the virtual world and that is close to the real sound source, may spread and float with a wind. For another example, when a person in the real world makes a shout, a flock of birds in the virtual world that are close to the location of the real sound source may perform an action of flying far away.

It should be noted that Embodiment 1 and Embodiment 3 provided in this application may be separately implemented, or may be implemented in combination. This is not limited in this application.

Figure 12:
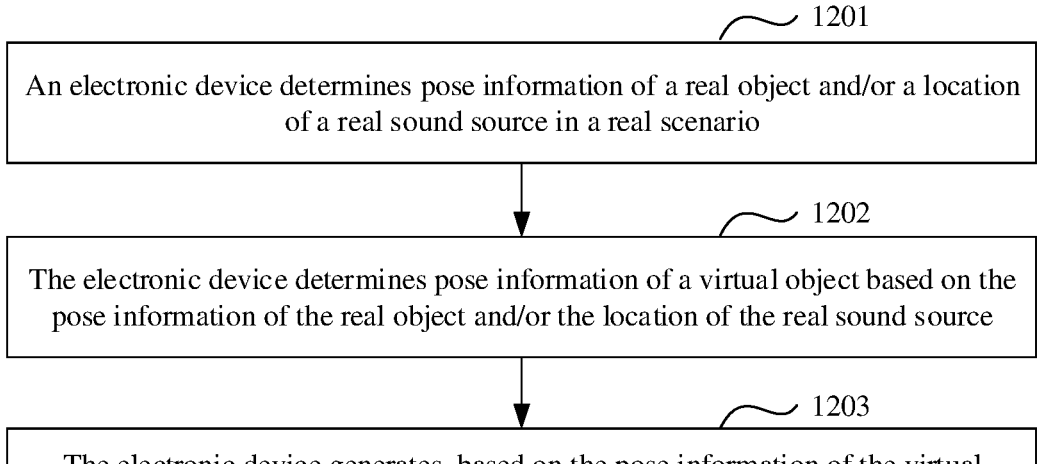
FIG. 12 is yet another flowchart of AR interaction according to an embodiment of this application.

For example, based on the foregoing embodiment, this application further provides an AR interaction method. As shown in FIG. 12, the method includes the following steps.

S1201: The electronic device determines pose information of the real object and/or the location of the real sound source in the real scenario, and the pose information of the real object represents a location and posture of the real object.

In an implementation, the electronic device may determine the pose information of the real object by performing the following steps:

The electronic device obtains a second real-scenario image captured by the camera, and recognizes a key portion of a real object in the second real-scenario image. The electronic device determines pose information of the key portion of the real object in the second real-scenario image by using a simultaneous localization and mapping SLAM point cloud collision detection technology. The electronic device uses the pose information of the key portion of the real object as the pose information of the real object.

In an implementation, the electronic device may determine the location of the real sound source by performing the following steps:

The electronic device obtains the real-scenario sound information collected by the microphone, and determines the location relationship between the real sound source and the microphone through sound source positioning. The electronic device determines the location of the real sound source in the real scenario based on the location relationship between the real sound source and the microphone.

For detailed descriptions of the foregoing determining process, refer to descriptions in the foregoing embodiment, and details are not described herein again.

S1202: The electronic device determines pose information of the virtual object based on the pose information of the real object and/or the location of the real sound source, and the pose information of the virtual object represents a location and posture of the virtual object.

In an implementation, before performing S1201, the electronic device may further establish the world coordinate system that uses the electronic device as the origin of coordinates. For example, the electronic device may establish the world coordinate system by performing the following steps: obtaining a first real-scenario image captured by the camera, and obtaining posture information of the electronic device measured by an inertial measurement unit; and establishing the world coordinate system based on the first real-scenario image and the posture information of the electronic device.

In this implementation, to improve accuracy of the information determined by the electronic device in S1201 and S1202, the pose information of the real object specifically represents the location and posture of the real object in the world coordinate system; the location of the real sound source is a location of the real sound source in the world coordinate system; and the pose information of the virtual object specifically represents the location and posture of the virtual object in the world coordinate system.

Optionally, the electronic device may determine the pose information of the virtual object based on the pose information of the real object and/or the location of the real sound source, and at least one of the following: an action of the real object recognized based on the pose information of the real object, the sound instruction sent by the real sound source, an image model, an action feature, and an action response package in a virtual object model corresponding to the virtual object, and a touch operation performed by a user on the virtual object by using a display.

S1203: The electronic device generates, based on the pose information of the virtual object, an AR image including the virtual object; and displays the AR image; and/or generates 3D audio data of the virtual object based on the pose information of the real object and the pose information of the virtual object; and plays the 3D audio data.

In an implementation, the electronic device may generate the 3D audio data of the virtual object by performing the following steps:

The electronic device separately determines distances between two ears of the virtual object and two ears of the real object based on the pose information of the real object and the pose information of the virtual object.

The electronic device calculates a volume difference and a time difference between the two ears of the real object based on the distances between the two ears of the virtual object and the two ears of the real object.

The electronic device generates the 3D audio data based on the volume difference and the time difference of the real object and original sound data of the virtual object.

Optionally, in this embodiment, the original sound data is set, or is determined based on at least one of the following: location and posture information of the real object, the pose information of the virtual object, the action of the real object recognized based on the pose information of the real object, the sound instruction sent by the real sound source, the image model, the action feature, and the action response package in the virtual object model corresponding to the virtual object, and the touch operation performed by the user on the virtual object by using the display.

Optionally, before playing the 3D audio data, the electronic device may further filter the 3D audio data based on the pose information of the real object, so that reflections and refractions of the 3D audio data in a transmission process may be simulated, to make a 3D sound heard by the real object more authentic.

This embodiment of this application provides an AR interaction method. In this method, the electronic device may determine the pose information of the virtual object based on the pose information of the real object or the location of the real sound source, to generate and display the AR image, and may further generate and play the 3D sound data of the virtual object based on the pose information of the real object and the pose information of the virtual object. It is clear that, according to this solution, the virtual object may perceive the pose of the real object and the location of the real sound source, and make a corresponding action response or sound response based on the foregoing information, so that the virtual object may be the same as the real object. Therefore, in this method, virtual-real interaction that combines visual and auditory perceptions of the virtual object and the real object is implemented. This can improve an intelligent level of the virtual object, and further improves experience of virtual interaction.

Figure 13:
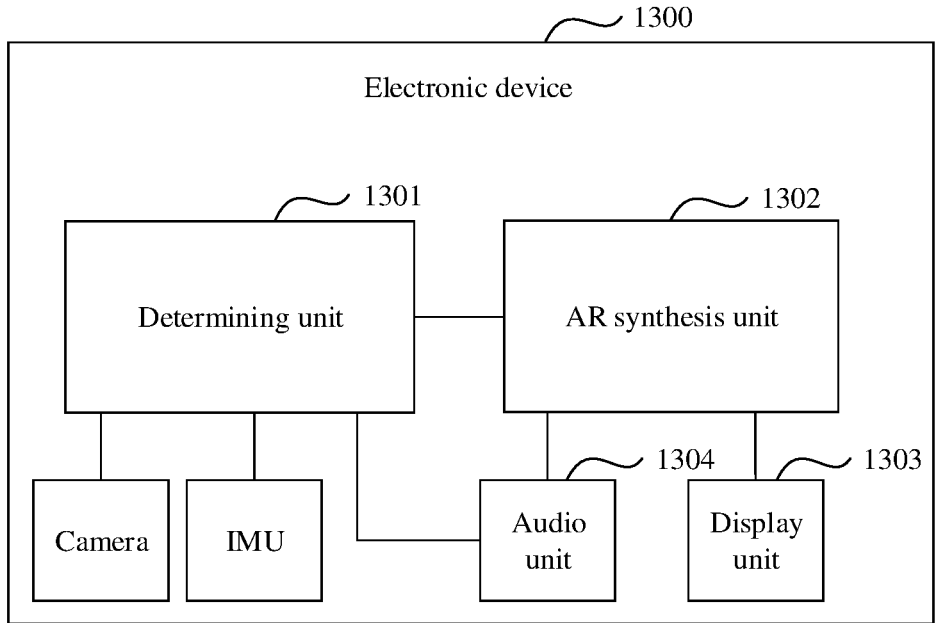
FIG. 13 is a diagram of a structure of another electronic device according to an embodiment of this application.

Based on a same technical idea, this application further provides an electronic device. The electronic device is configured to implement the method provided in the foregoing embodiments. As shown in FIG. 13, an electronic device 1300 may include a determining unit 1301, an AR synthesis unit 1302, a display unit 1303, and an audio unit 1304.

The display unit 1303 is configured to present a user interface (for example, an AR image), to implement human-computer interaction. Same as the display unit 204 in the electronic device shown in FIG. 2, the display unit 1303 includes a display panel, and the display panel is also referred to as a display.

The audio unit 1304 is configured to collect a sound signal and play audio data. Similar to the audio circuit 206 in the electronic device shown in FIG. 2, the audio unit 1304 may include a speaker and a microphone.

The following describes a function of each unit when the method provided in the foregoing embodiment is implemented.

The determining unit 1301 is configured to: determine pose information of a real object and/or a location of a real sound source in a real scenario, where the pose information of the real object represents a location and posture of the real object; and determine pose information of a virtual object based on the pose information of the real object and/or the location of the real sound source, where the pose information of the virtual object represents a location and posture of the virtual object.

The AR synthesis unit 1302 is configured to: generate, based on the pose information of the virtual object, an AR image including the virtual object; and/or generate three-dimensional 3D audio data of the virtual object based on the pose information of the real object and the pose information of the virtual object.

The display unit 1303 is configured to display the AR image.

The audio unit 1304 is configured to play the 3D audio data.

In an implementation, the determining unit 1301 is further configured to:

establish a world coordinate system that uses the electronic device as an origin of coordinates.

The pose information of the real object specifically represents the location and posture of the real object in the world coordinate system.

The location of the real sound source is the location of the real sound source in the world coordinate system.

The pose information of the virtual object specifically represents the location and posture of the virtual object in the world coordinate system.

In an implementation, if the electronic device 1300 further includes a camera and an inertial measurement unit, when establishing the world coordinate system that uses the electronic device as the origin of coordinates, the determining unit 1301 is specifically configured to: obtain a first real-scenario image captured by a camera, and obtain posture information of the electronic device measured by an inertial measurement unit; and establish the world coordinate system based on the first real-scenario image and the posture information of the electronic device.

In an implementation, if the electronic device 1300 further includes a camera, when determining the pose information of the real object in the real scenario, the determining unit 1301 is specifically configured to: obtain a second real-scenario image captured by the camera, and recognize a key portion of a real object in the second real-scenario image; determine pose information of the key portion of the real object in the second real-scenario image by using a simultaneous localization and mapping SLAM point cloud collision detection technology; and use the pose information of the key portion of the real object as the pose information of the real object.

In an implementation, if the audio unit 1304 further includes a microphone, when determining the location of the real sound source in the real scenario, the determining unit 1301 is specifically configured to: obtain real-scenario sound information collected by the microphone, and determine a location relationship between the real sound source and the microphone through sound source positioning; and determine the location of the real sound source in the real scenario based on the location relationship between the real sound source and the microphone.

In an implementation, when determining the pose information of the virtual object based on the pose information of the real object and/or the location of the real sound source, the AR synthesis unit 1302 is specifically configured to: determine the pose information of the virtual object based on the pose information of the real object and/or the location of the real sound source, and at least one of the following: an action of the real object recognized based on the pose information of the real object, a sound instruction sent by the real sound source, an image model, an action feature, and an action response package in a virtual object model corresponding to the virtual object, and a touch operation performed by a user on the virtual object by using a display.

In an implementation, when generating the 3D audio data of the virtual object based on the pose information of the real object and the pose information of the virtual object, the AR synthesis unit 1302 is specifically configured to: separately determine distances between two ears of the virtual object and two ears of the real object based on the pose information of the real object and the pose information of the virtual object; calculate a volume difference and a time difference between the two ears of the real object based on the distances between the two ears of the virtual object and the two ears of the real object; and generate the 3D audio data based on the volume difference and the time difference of the real object and original sound data of the virtual object.

In an implementation, the original sound data is set, or is determined based on at least one of the following: location and posture information of the real object, the pose information of the virtual object, the action of the real object recognized based on the pose information of the real object, the sound instruction sent by the real sound source, the image model, the action feature, and the action response package in the virtual object model corresponding to the virtual object, and the touch operation performed by the user on the virtual object by using the display.

In an implementation, the AR synthesis unit 1302 is further configured to: before the audio unit 1304 plays the 3D audio data, filter the 3D audio data based on the pose information of the real object.

It should be noted that in embodiments of this application, division into modules is an example, and is only a logical function division. During actual implementation, there may be another division manner. In addition, functional units in embodiments of this application may be integrated into one processing unit, or may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Figure 14:
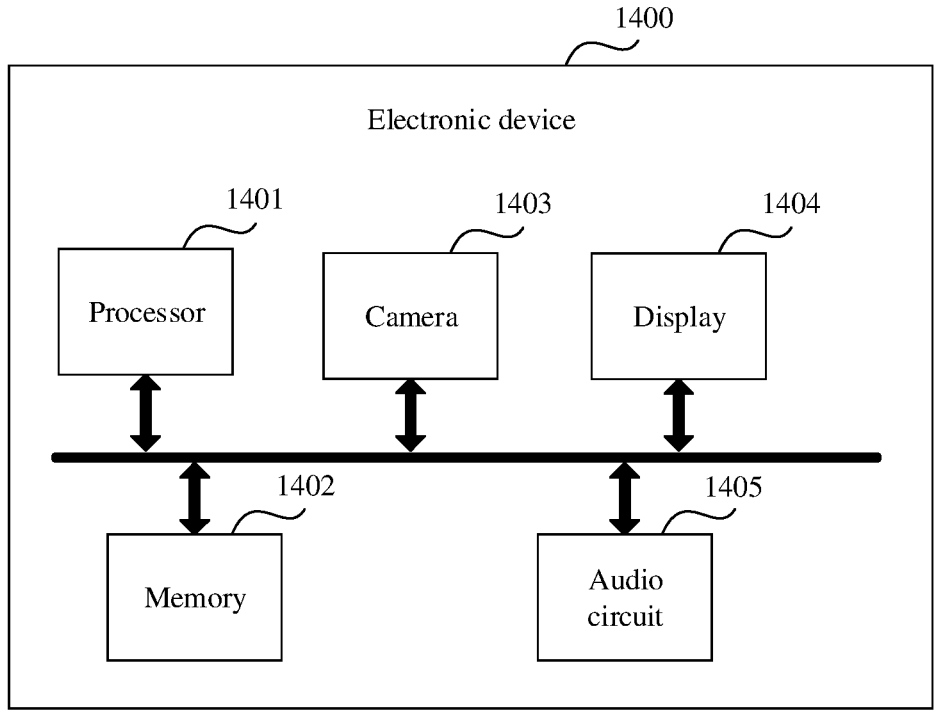
FIG. 14 is a diagram of a structure of still another electronic device according to an embodiment of this application.

Based on a same technical idea, an embodiment of this application further provides an electronic device. The electronic device is configured to implement the AR interaction method provided in the foregoing embodiments, and has the function of the electronic device shown in FIG. 13. As shown in FIG. 14, an electronic device 1400 may include a processor 1401, a memory 1402, a camera 1403, a display 1404, and an audio circuit 1405. Certainly, the electronic device 1400 may further include peripheral or internal hardware shown in FIG. 2.

The processor 1401 and another component are connected to each other. Optionally, the processor 1401 and the another component may be connected to each other by using a bus. The bus may be a peripheral component interconnect (PCI) bus, an extended industry standard architecture (EISA) bus, or the like. The bus may be classified into an address bus, a data bus, a control bus, and the like. For ease of representation, only one bold line represents the bus in FIG. 14, but this does not mean that there is only one bus or only one type of bus.

The processor 1401 is configured to implement the AR interaction method provided in the foregoing embodiments, and the method includes: determining pose information of a real object and/or a location of a real sound source in a real scenario, where the pose information of the real object represents a location and posture of the real object; determining pose information of a virtual object based on the pose information of the real object and/or the location of the real sound source, where the pose information of the virtual object represents a location and posture of the virtual object; and generating, based on the pose information of the virtual object, an AR image including the virtual object; and displaying the AR image by using the display 1404; and/or generating three-dimensional 3D audio data of the virtual object based on the pose information of the real object and the pose information of the virtual object; and playing the 3D audio data by using the audio circuit 1405.

For a specific process in the foregoing step, refer to descriptions in the foregoing embodiments, and details are not described herein again.

The memory 1402 is configured to store program instructions, data, and the like. Specifically, the program instructions may include program code, and the program code includes computer operation instructions. The memory 1402 may include a random access memory (RAM), or may be a nonvolatile memory, for example, at least one magnetic disk memory. The processor 1401 executes a program stored in the memory 1402, and implements the foregoing functions by using the foregoing components, to finally implement the method provided in the foregoing embodiments.

Based on the foregoing embodiments, an embodiment of this application further provides a computer program. When the computer program is run on a computer, the computer is enabled to perform the method provided in the foregoing embodiments.

Based on the foregoing embodiments, an embodiment of this application further provides a computer storage medium. The computer storage medium stores a computer program. When the computer program is executed by a computer, the computer is enabled to perform the method provided in the foregoing embodiments.

Based on the foregoing embodiments, an embodiment of this application further provides a chip. The chip is configured to read a computer program stored in a memory, to implement the method provided in the foregoing embodiments.

Based on the foregoing embodiments, an embodiment of this application further provides a chip system. The chip system includes a processor, configured to support a computer apparatus in implementing functions related to the electronic device in the method provided in the foregoing embodiments. In a possible design, the chip system further includes a memory. The memory is configured to store a program and data that are necessary for the computer apparatus. The chip system may include a chip, or may include a chip and another discrete component.

In conclusion, this application provides an AR interaction method and an electronic device. In this solution, an electronic device may determine pose information of a virtual object based on pose information of a real object or a location of a real sound source, to generate and display an AR image, and may further generate and play 3D sound data of the virtual object based on the pose information of the real object and the pose information of the virtual object. It is clear that, according to this solution, the virtual object may perceive a pose of the real object and the location of the real sound source, and make a corresponding action response or sound response based on the foregoing information, so that the virtual object may be the same as the real object. Therefore, in this method, virtual-real interaction that combines visual and auditory perceptions of the virtual object and the real object is implemented. This can improve an intelligent level of the virtual object, and further improves experience of virtual interaction.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device, to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, applied to an electronic device, the method comprising:

determining pose information of a real object and a location of a real sound source in a real scenario, wherein the pose information of the real object represents a location and posture of the real object;

determining pose information of a virtual object based on the pose information of the real object and the location of the real sound source, wherein the pose information of the virtual object represents a location and posture of the virtual object;

generating, based on the pose information of the virtual object, an augmented reality (AR) image comprising the virtual object;

displaying the AR image;

generating three-dimensional (3D) audio data of the virtual object based on the pose information of the real object and the pose information of the virtual object; and playing the 3D audio data; and wherein determining the pose information of the virtual object based on the pose information of the real object and the location of the real sound source comprises:

determining the pose information of the virtual object based on the pose information of the real object and the location of the real sound source, and based on at least one of the following: an action of the real object recognized based on the pose information of the real object, a sound instruction sent by the real sound source, an image model, an action feature and an action response package in a virtual object model corresponding to the virtual object, or a touch operation performed by a user on the virtual object by using a display screen; and wherein generating the 3D audio data of the virtual object based on the pose information of the real object and the pose information of the virtual object comprises:

determining a first distance between the virtual object and a first ear of the real object based on the pose information of the real object and the pose information of the virtual object, and determining a second distance between the virtual object and a second ear of the real object based on the pose information of the real object and the pose information of the virtual object;

calculating a volume difference and a time difference between the first ear and the second ear of the real object based on the first distance and the second distance; and generating the 3D audio data based on the volume difference and the time difference of the real object and original sound data of the virtual object.

2. The method according to claim 1, further comprising:

establishing a world coordinate system that uses the electronic device as an origin of coordinates, and wherein:

the pose information of the real object represents the location and posture of the real object in the world coordinate system;

the location of the real sound source is the location of the real sound source in the world coordinate system; and the pose information of the virtual object represents the location and posture of the virtual object in the world coordinate system.

3. The method according to claim 2, wherein establishing the world coordinate system that uses the electronic device as the origin of coordinates comprises:

obtaining a first real-scenario image captured by a camera, and obtaining posture information of the electronic device measured by an inertial measurement unit; and establishing the world coordinate system based on the first real-scenario image and the posture information of the electronic device.

4. The method according to claim 3, wherein the display screen of the electronic device is parallel to two directional axes of the world coordinate system, and is perpendicular to another directional axis of the world coordinate system.

5. The method according to claim 4, wherein:

the coordinate origin is a corner of the display screen of the electronic device;

the coordinate origin is a center point of one side of the display screen of the electronic device;

the coordinate origin is a center point of the display screen; or the coordinate origin is any preset point on the display screen.

6. The method according to claim 1, wherein determining the pose information of the real object in the real scenario comprises:

obtaining a second real-scenario image captured by a camera, and recognizing a key portion of a real object in the second real-scenario image;

determining pose information of the key portion of the real object in the second real-scenario image using a simultaneous localization and mapping (SLAM) point cloud collision detection technology; and using the pose information of the key portion of the real object as the pose information of the real object.

7. The method according to claim 1, wherein determining the location of the real sound source in the real scenario comprises:

obtaining real-scenario sound information collected by a microphone, and determining a location relationship between the real sound source and the microphone through sound source positioning; and determining the location of the real sound source in the real scenario based on the location relationship between the real sound source and the microphone.

8. The method according to claim 1, wherein the original sound data is set, or the original sound data is determined based on at least one of the following:

location and posture information of the real object, the pose information of the virtual object, the action of the real object recognized based on the pose information of the real object, the sound instruction sent by the real sound source, the image model, the action feature and the action response package in the virtual object model corresponding to the virtual object, or the touch operation performed by the user on the virtual object by using the display screen.

9. A method, applied to an electronic device, the method comprising:

determining pose information of a real object and a location of a real sound source in a real scenario, wherein the pose information of the real object represents a location and posture of the real object;

determining pose information of a virtual object based on the pose information of the real object and the location of the real sound source, wherein the pose information of the virtual object represents a location and posture of the virtual object;

generating three-dimensional (3D) audio data of the virtual object based on the pose information of the real object and the pose information of the virtual object; and playing the 3D audio data; and wherein determining the pose information of the virtual object based on the pose information of the real object and the location of the real sound source comprises:

determining the pose information of the virtual object based on the pose information of the real object and the location of the real sound source, and based on at least one of the following: an action of the real object recognized based on the pose information of the real object, a sound instruction sent by the real sound source, an image model, an action feature and an action response package in a virtual object model corresponding to the virtual object, or a touch operation performed by a user on the virtual object by using a display screen; and wherein generating the 3D audio data of the virtual object based on the pose information of the real object and the pose information of the virtual object comprises:

determining a first distance between the virtual object and a first ear of the real object based on the pose information of the real object and the pose information of the virtual object, and determining a second distance between the virtual object and a second ear of the real object based on the pose information of the real object and the pose information of the virtual object;

calculating a volume difference and a time difference between the first ear and the second ear of the real object based on the first distance and the second distance; and generating the 3D audio data based on the volume difference and the time difference of the real object and original sound data of the virtual object.

10. The method according to claim 9, wherein the original sound data is set, or the original sound data is determined based on at least one of the following:

location and posture information of the real object, the pose information of the virtual object, the action of the real object recognized based on the pose information of the real object, the sound instruction sent by the real sound source, the image model, the action feature and the action response package in the virtual object model corresponding to the virtual object, or the touch operation performed by the user on the virtual object by using the display screen.

11. The method according to claim 9, wherein before playing the 3D audio data, the method further comprises:

filtering the 3D audio data based on the pose information of the real object.

12. An electronic device, comprising:

at least one processor; and a non-transitory computer readable medium storing computer-executable instructions, wherein the at least one processor is configured to execute the computer-executable instructions, and executing the computer-executable instructions enables the electronic device to perform operations comprising:

determining pose information of a real object and a location of a real sound source in a real scenario, wherein the pose information of the real object represents a location and posture of the real object;

determining pose information of a virtual object based on the pose information of the real object and the location of the real sound source, wherein the pose information of the virtual object represents a location and posture of the virtual object;

generating, based on the pose information of the virtual object, an augmented reality (AR) image comprising the virtual object;

displaying the AR image;

generating three-dimensional (3D) audio data of the virtual object based on the pose information of the real object and the pose information of the virtual object; and playing the 3D audio data; and wherein determining the pose information of the virtual object based on the pose information of the real object and the location of the real sound source comprises:

determining the pose information of the virtual object based on the pose information of the real object and the location of the real sound source, and based on at least one of the following: an action of the real object recognized based on the pose information of the real object, a sound instruction sent by the real sound source, an image model, an action feature and an action response package in a virtual object model corresponding to the virtual object, or a touch operation performed by a user on the virtual object by using a display screen; and wherein generating the 3D audio data of the virtual object based on the pose information of the real object and the pose information of the virtual object comprises:

determining a first distance between the virtual object and a first ear of the real object based on the pose information of the real object and the pose information of the virtual object, and determining a second distance between the virtual object and a second ear of the real object based on the pose information of the real object and the pose information of the virtual object;

calculating a volume difference and a time difference between the first ear and the second ear of the real object based on the first distance and the second distance; and generating the 3D audio data based on the volume difference and the time difference of the real object and original sound data of the virtual object.

13. The electronic device according to claim 12, wherein executing the computer-executable instructions enables the electronic device to perform operations further comprising:

establishing a world coordinate system that uses the electronic device as an origin of coordinates, wherein:

the pose information of the real object represents the location and posture of the real object in the world coordinate system;

the location of the real sound source is the location of the real sound source in the world coordinate system; and the pose information of the virtual object represents the location and posture of the virtual object in the world coordinate system.

14. The electronic device according to claim 13, wherein establishing the world coordinate system that uses the electronic device as the origin of coordinates comprises:

obtaining a first real-scenario image captured by a camera, and obtaining posture information of the electronic device measured by an inertial measurement unit; and establishing the world coordinate system based on the first real-scenario image and the posture information of the electronic device.

15. The electronic device according to claim 12, wherein determining the pose information of the real object in the real scenario comprises:

obtaining a second real-scenario image captured by a camera, and recognizing a key portion of a real object in the second real-scenario image;

determining pose information of the key portion of the real object in the second real-scenario image by using a simultaneous localization and mapping (SLAM) point cloud collision detection technology; and using the pose information of the key portion of the real object as the pose information of the real object.

16. The electronic device according to claim 12, wherein determining the location of the real sound source in the real scenario comprises:

obtaining real-scenario sound information collected by a microphone, and determining a location relationship between the real sound source and the microphone through sound source positioning; and determining the location of the real sound source in the real scenario based on the location relationship between the real sound source and the microphone.

17. The electronic device according to claim 12, wherein the original sound data is set, or the original sound data is determined based on at least one of the following:

location and posture information of the real object, the pose information of the virtual object, the action of the real object recognized based on the pose information of the real object, the sound instruction sent by the real sound source, the image model, the action feature and the action response package in the virtual object model corresponding to the virtual object, or the touch operation performed by the user on the virtual object by using the display screen.

18. An electronic device, comprising:

at least one processor; and a non-transitory computer readable medium storing computer-executable instructions, wherein the at least one processor is configured to execute the computer-executable instructions, and executing the computer-executable instructions enables the electronic device to perform operations comprising:

determining pose information of a real object and a location of a real sound source in a real scenario, wherein the pose information of the real object represents a location and posture of the real object;

determining pose information of a virtual object based on the pose information of the real object and the location of the real sound source, wherein the pose information of the virtual object represents a location and posture of the virtual object;

generating three-dimensional (3D) audio data of the virtual object based on the pose information of the real object and the pose information of the virtual object; and playing the 3D audio data; and wherein determining the pose information of the virtual object based on the pose information of the real object and the location of the real sound source comprises:

determining the pose information of the virtual object based on the pose information of the real object and the location of the real sound source, and based on at least one of the following: an action of the real object recognized based on the pose information of the real object, a sound instruction sent by the real sound source, an image model, an action feature and an action response package in a virtual object model corresponding to the virtual object, or a touch operation performed by a user on the virtual object by using a display screen; and wherein generating the 3D audio data of the virtual object based on the pose information of the real object and the pose information of the virtual object comprises:

determining a first distance between the virtual object and a first ear of the real object based on the pose information of the real object and the pose information of the virtual object and determining a second distance between the virtual object and a second ear of the real object based on the pose information of the real object and the pose information of the virtual object;

calculating a volume difference and a time difference between the first ear and the second ear of the real object based on the first distance and the second distance; and generating the 3D audio data based on the volume difference and the time difference of the real object and original sound data of the virtual object.

19. The electronic device according to claim 18, wherein the original sound data is set, or the original sound data is determined based on at least one of the following:

location and posture information of the real object, the pose information of the virtual object, the action of the real object recognized based on the pose information of the real object, the sound instruction sent by the real sound source, the image model, the action feature and the action response package in the virtual object model corresponding to the virtual object, or the touch operation performed by the user on the virtual object by using the display screen.

20. The electronic device according to claim 18, wherein executing the computer-executable instructions enables the electronic device to perform operations further comprising:

before playing the 3D audio data, filtering the 3D audio data based on the pose information of the real object.

\* \* \* \* \*